(12) United States Patent
Higuchi et al.

(10) Patent No.: US 10,924,337 B2
(45) Date of Patent: Feb. 16, 2021

(54) VEHICULAR CLOUD SLICING

(71) Applicant: TOYOTA JIDOSHA KABUSHIKI KAISHA, Toyota (JP)

(72) Inventors: Takamasa Higuchi, Mountain View, CA (US); Onur Altintas, Mountain View, CA (US); Seyhan Ucar, Mountain View, CA (US); Toru Nakanishi, Nagakute (JP)

( * ) Notice: Subject to any disclaimer, the term of this patent is extended or adjusted under 35 U.S.C. 154(b) by 19 days.

(21) Appl. No.: 16/367,003

(22) Filed: Mar. 27, 2019

(65) Prior Publication Data
US 2020/0313959 A1    Oct. 1, 2020

(51) Int. Cl.
*H04W 4/40*    (2018.01)
*H04L 12/24*   (2006.01)
*H04L 29/08*   (2006.01)

(52) U.S. Cl.
CPC .......... *H04L 41/0803* (2013.01); *H04L 67/10* (2013.01); *H04L 67/12* (2013.01); *H04W 4/40* (2018.02)

(58) Field of Classification Search
CPC .......... H04L 67/42; H04L 45/24; H04L 69/16; H04L 45/74; H04L 41/046; H04L 43/10; H04L 43/0817
USPC ...................................................... 709/223
See application file for complete search history.

(56) References Cited

U.S. PATENT DOCUMENTS

| | | | |
|---|---|---|---|
| 2018/0281598 A1* | 10/2018 | Shu | G05B 19/042 |
| 2019/0026796 A1* | 1/2019 | Dinis da Silva de Carvalho | G06Q 50/30 |
| 2019/0359220 A1* | 11/2019 | Wilson | A61B 5/02055 |
| 2020/0061811 A1* | 2/2020 | Iqbal | G06T 7/73 |

OTHER PUBLICATIONS

EPO, International Search Report and Written Opinion for International Patent Application No. PCT/US2020/024970, dated Jun. 17, 2020, 14 pages.
Lee, et al., "Vehicular Cloud Networking: Architecture and Design Principles," IEEE Communications Magazine, vol. 52, No. 2, Feb. 1, 2014, pp. 148-155.

* cited by examiner

*Primary Examiner* — Frantz B Jean
(74) *Attorney, Agent, or Firm* — Burbage Law, P.C.; Jon-Michael Burbage; Elizabeth Ruzich

(57) ABSTRACT

The disclosure includes embodiments for coordinating a resource usage of a connected endpoint based on a resource slice. In some embodiments, a method for a connected endpoint that contributes to a provisioning of a cloudification service in a vehicular micro cloud includes modifying an operation of a communication unit of the connected endpoint to receive a Vehicle-to-Everything (V2X) message that includes a command to implement a resource slice for provisioning the cloudification service. The resource slice describes a set of onboard resources to be reserved by the connected endpoint. The method further includes providing the set of onboard resources to execute one or more tasks for the cloudification service based on the resource slice so that a resource usage of the connected endpoint is coordinated based on the resource slice to improve performance of the connected endpoint.

20 Claims, 13 Drawing Sheets

US 10,924,337 B2

VEHICULAR CLOUD SLICING

BACKGROUND

The specification relates to coordinating a usage of resources across connected endpoints to fulfill cloudification services in a vehicular micro cloud.

In the future, vehicles are expected to exchange an increasing amount of data content with remote cloud servers (e.g., by way of cellular networks). Examples of such data content include one or more of the following: three-dimensional road maps for automated driving; content for infotainment services; etc. An increasing amount of network traffic between the vehicles and cloud servers may cause a significant load on radio access networks and underlying backbone networks. Cloud computing aids are needed to assist connected vehicles to exchange this data with the cloud servers.

SUMMARY

Distributed data storage and distributed computing by a cluster of connected vehicles (i.e., a "vehicular micro cloud") is a promising solution to cope with the increasing network traffic generated for and by connected vehicles. As vehicular micro clouds, vehicles: collaboratively store (or cache) data content in their onboard data storage devices; collaboratively share data content over vehicle-to-vehicle (V2V) networks as requested by other vehicles; collaboratively compute the solutions to problems; collaboratively execute computer programs; and collaboratively provide computing services to one another or a group of vehicles.

Multiple vehicular micro clouds can be interconnected over V2V networks to form a wide-scale vehicular macro cloud. In the vehicular macro cloud, vehicles can request data contents and task execution from other vehicles or vehicular micro clouds of the vehicular macro cloud by accessing the other vehicles or vehicular micro clouds over V2V networks.

Described are embodiments of a resource manager installed in a variety of connected endpoints located in a roadway environment. The connected endpoints may include connected vehicles or any other processor-based connected endpoints such as a roadside unit, an edge server, and a cloud server, etc.

In some embodiments, the resource manager is installed in onboard units of a plurality of connected vehicles. The plurality of connected vehicles is organized into vehicular micro clouds or vehicular macro clouds. Vehicular micro clouds and vehicular macro clouds are referred to collectively or individually as "vehicular clouds." Connected vehicles that are members of a vehicular cloud share their computing resources with one another (e.g., their computational abilities, storage abilities, etc.) to provide cloudification services to different connected vehicles. Vehicles that are included in these vehicular clouds are referred to as "members."

Vehicular clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

Described are embodiments of a resource orchestrator installed in a roadside edge server or a cloud server and a resource manager installed in an onboard unit of a connected endpoint (e.g., a connected vehicle). In some embodiments, the resource orchestrator and the resource manager cooperate with one another to coordinate a usage of resources across multiple connected endpoints (e.g., multiple host vehicles in a vehicular micro cloud) so that multiple cloudification services can be provided by these connected endpoints without degrading fulfillment of other cloudification services that are simultaneously provided by these connected endpoints.

In some embodiments, the resource orchestrator is itself an element of a connected vehicle. The connected vehicles are organized into vehicular micro clouds or vehicular macro clouds (i.e., vehicular clouds). In this way, the connected vehicles share their computing resources (e.g., their computational abilities, storage abilities, etc.) with one another to provide cloudification services to the different connected vehicles.

In some embodiments, various resource managers are installed in various connected vehicles respectively. The resource orchestrator uses wireless messages to cooperate with the resource managers of the various connected vehicles to: determine cloudification services that may be needed or requested; determine computing resources that are available across the various connected vehicles; determine resource slices for providing each of the cloudification services; and generate commands that are sent to the resource managers to implement and utilize these resource slices.

In some embodiments, the resource managers implement the resource slices and respond to the commands to utilize the resource slices so that the cloudification services are provided as requested.

An example advantage and improvement provided by embodiments described herein over existing solutions include beneficially providing a solution to coordinate the use of resources across multiple host vehicles of a vehicular micro cloud so that multiple cloudification services can be provided by these host vehicles without degrading the fulfillment of other cloudification services that are simultaneously provided by these host vehicles.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a method for a connected endpoint that contributes to a provisioning of a cloudification service in a vehicular micro cloud, the method including: modifying an operation of a communication unit of the connected endpoint to receive a Vehicle-to-Everything (V2X) message that includes a command to implement a resource slice for provisioning the cloudification service, where the resource slice describes a set of onboard resources to be reserved by the connected endpoint; and providing the set of onboard resources to execute one or more tasks for the cloudification service based on the resource slice so that a resource usage of the connected endpoint is coordinated based on the resource slice to improve performance of the connected endpoint. Other embodiments of this aspect include corresponding computer systems, apparatus, and computer programs recorded on one or more computer storage devices, each configured to perform the actions of the methods.

Implementations may include one or more of the following features. The method where the resource slice describes a resource type and a reservation amount of each onboard resource to be reserved by the connected endpoint. The method where an amount of each onboard resource consumed by an execution of the one or more tasks is not greater than the reservation amount of the corresponding onboard resource indicated by the resource slice. The method where the resource slice describes multiple sets of onboard resources to be reserved by multiple connected endpoints so that resource usages across the multiple connected endpoints are coordinated based on the resource slice to improve performance of the multiple connected endpoints. The method where the resource slice is configured to host a group of cloudification services simultaneously in the vehicular micro cloud so that the resource usages across the multiple connected endpoints are coordinated based on the resource slice to provision the group of cloudification services simultaneously. The method where the resource slice satisfies one or more slice determination parameters that include one or more of the following: a constraint of a geographical region where the provisioning of the cloudification service is located; one or more resource requirements related to the provisioning of the cloudification service; one or more resource attributes defined in a standard; and a slice priority attribute. The method where a geographical location of the set of onboard resources changes over time due to a mobility of the connected endpoint. The method further including: registering the set of onboard resources to a resource orchestrator, where a registration of the set of onboard resources to the resource orchestrator causes the resource orchestrator to keep the set of onboard resources in a resource pool and to determine the resource slice based on the resource pool. The method further including: determining that the set of onboard resources becomes unavailable on the connected endpoint; reporting an unavailability of the set of onboard resources to the resource orchestrator, where a report of the unavailability causes the resource orchestrator to update the resource pool and the resource slice based on the unavailability of the set of onboard resources and to issue an instruction to the connected endpoint to hand over an execution of the one or more tasks to another connected endpoint; and responsive to receiving the instruction from the resource orchestrator, handing over the execution of the one or more tasks to the other connected endpoint. The method further including: receiving a resource query from the resource orchestrator; and responsive to receiving the resource query, reporting an update on one or more of an availability of the set of onboard resources and a geographical location of the connected endpoint to the resource orchestrator, where a report of the update causes the resource orchestrator to update one or more of the resource pool and the resource slice. The method where the connected endpoint acts as a lower-tier resource orchestrator and the method further including: managing, by the connected endpoint, positions and resource availability of members in the vehicular micro cloud; and reporting, by the connected endpoint, the positions and the resource availability of the members in the vehicular micro cloud to an upper-tier resource orchestrator. The method further including: receiving, by the connected endpoint, a request from the upper-tier resource orchestrator to reserve one or more resources in the vehicular micro cloud; and identifying a set of members in the vehicular micro cloud for providing the one or more resources requested by the upper-tier resource orchestrator based on a local resource pool managed by the connected endpoint so that a provisioning of the one or more resources requested by the upper-tier resource orchestrator is guaranteed in the vehicular micro cloud. Implementations of the described techniques may include hardware, a method or process, or computer software on a computer-accessible medium.

One general aspect includes a system of a connected endpoint that contributes to a provisioning of a cloudification service in a vehicular micro cloud, the system including a processor and a non-transitory memory storing computer code which, when executed by the processor, causes the processor to: modify an operation of a communication unit of the connected endpoint to receive a Vehicle-to-Everything (V2X) message that includes a command to implement a resource slice for provisioning the cloudification service, where the resource slice describes a set of onboard resources to be reserved by the connected endpoint; and provide the set of onboard resources to execute one or more tasks for the cloudification service based on the resource slice so that a resource usage of the connected endpoint is coordinated based on the resource slice to improve performance of the connected endpoint. Other embodiments of this aspect include corresponding computer systems, apparatus, and computer programs recorded on one or more computer storage devices, each configured to perform the actions of the methods.

Implementations may include one or more of the following features. The system where the resource slice describes a resource type and a reservation amount of each onboard resource to be reserved by the connected endpoint. The system where an amount of each onboard resource consumed by an execution of the one or more tasks is not greater than the reservation amount of the corresponding onboard resource indicated by the resource slice. The system where the resource slice describes multiple sets of onboard resources to be reserved by multiple connected endpoints so that resource usages across the multiple connected endpoints are coordinated based on the resource slice to improve performance of the multiple connected endpoints. The system where the resource slice is configured to host a group of cloudification services simultaneously in the vehicular micro cloud so that the resource usages across the multiple connected endpoints are coordinated based on the resource slice to provision the group of cloudification services simultaneously. Implementations of the described techniques may include hardware, a method or process, or computer software on a computer-accessible medium.

One general aspect includes a computer program product including a non-transitory memory storing computer-executable code that, when executed by a processor, causes the processor to: modify an operation of a communication unit of a connected endpoint to receive a Vehicle-to-Everything (V2X) message that includes a command to implement a resource slice for provisioning a cloudification service, where the resource slice describes a set of onboard resources to be reserved by the connected endpoint; and provide the set of onboard resources to execute one or more tasks for the cloudification service based on the resource slice so that a resource usage of the connected endpoint is coordinated based on the resource slice to improve performance of the connected endpoint. Other embodiments of this aspect include corresponding computer systems, apparatus, and computer programs recorded on one or more computer storage devices, each configured to perform the actions of the methods.

Implementations may include one or more of the following features. The computer program product where the resource slice describes a resource type and a reservation amount of each onboard resource to be reserved by the connected endpoint. The computer program product where an amount of each onboard resource consumed by an execution of the one or more tasks is not greater than the reservation amount of the corresponding onboard resource indicated by the resource slice. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
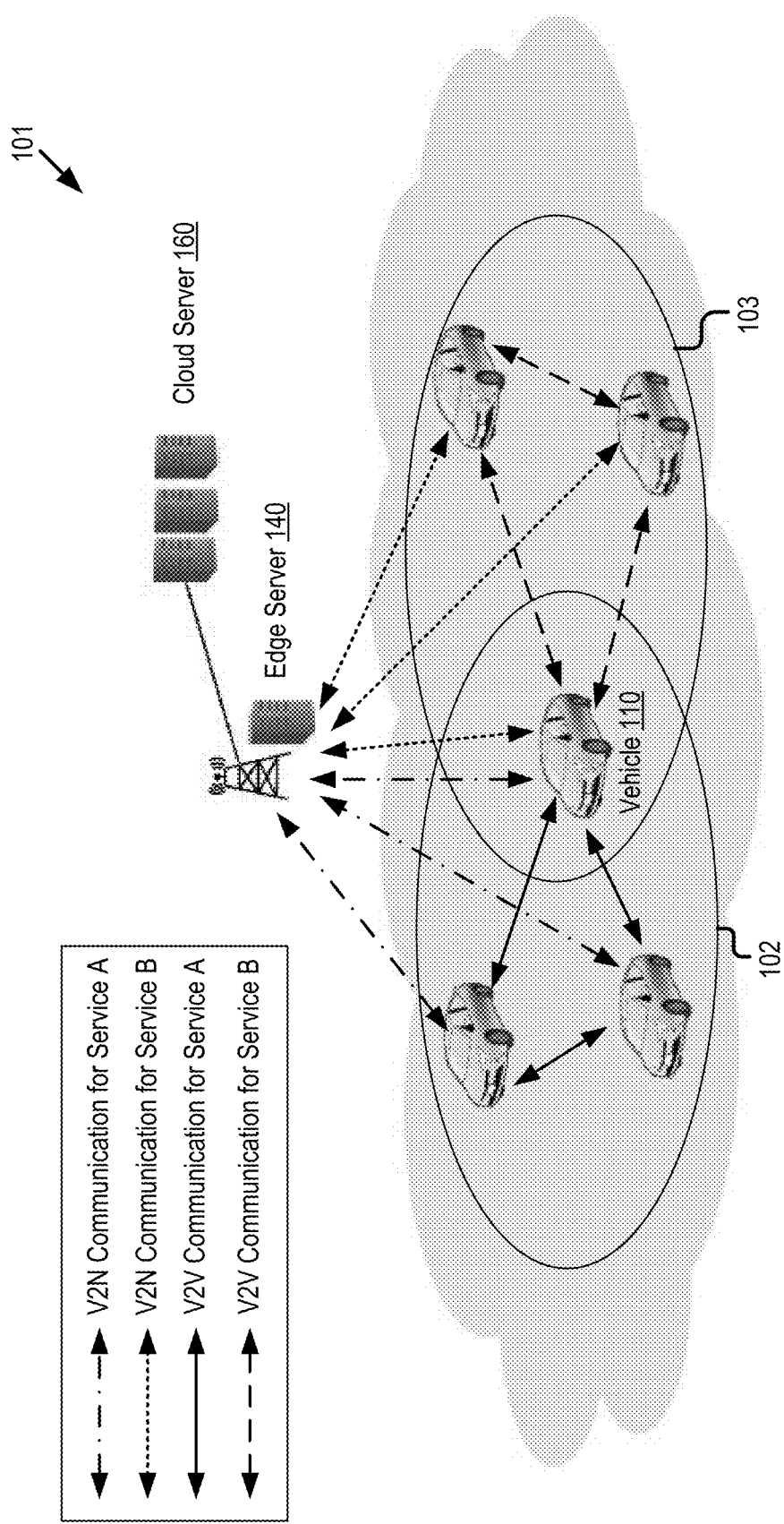
FIG. 1A is a block diagram illustrating an example scenario where a vehicle in a vehicular micro cloud may host multiple cloudification services in parallel according to some embodiments.

Connected vehicles that are close by one another can form a vehicular micro cloud and are referred to as "cloud members" or "members of the vehicular micro cloud" herein. The connected vehicles collaboratively perform computation, data storage, sensing, communication tasks and any combination thereof among the cloud members over Vehicle-to-Everything (V2X) networks such as Vehicle-to-Vehicle (V2V) networks, including but not limited to the following: (1) collaboratively performing resource-intensive computational tasks among the multiple cloud members; (2) collaboratively keeping and updating data content among the multiple cloud members; (3) collaboratively performing sensing of road conditions by on-board sensors of the multiple cloud members; and (4) collaboratively downloading or uploading data content from or to a cloud server (or an edge server).

Using vehicular micro clouds removes the need for the connected vehicles to access remote cloud servers or edge servers by vehicle-to-network (V2N) communications (e.g., by cellular networks) whenever they need to get access to data (e.g., high-definition road map for automated driving). Depending on mobility of the vehicular micro clouds, the vehicular micro clouds can be categorized into two types by way of examples: a stationary vehicular micro cloud; and a mobile vehicular micro cloud.

A stationary vehicular micro cloud can be tied to a certain geographical region (e.g., an intersection). A vehicle joins a stationary vehicular micro cloud when entering a pre-defined geographical region of the stationary vehicular micro cloud and leaves the stationary vehicular micro cloud when exiting from the pre-defined geographical region. When exiting from the pre-defined geographical region, the vehicle also hands over on-going tasks and data of the stationary vehicular micro cloud to other cloud members. In some embodiments, parked vehicles can also be members of the stationary vehicular micro cloud.

In a mobile vehicular micro cloud, a cloud leader (e.g., a connected vehicle which acts as a leader in the vehicular micro cloud) can invite its neighboring vehicles to join the mobile vehicular micro cloud. Unlike the stationary vehicular micro cloud, the mobile vehicular micro cloud moves as the cloud leader moves. The cloud leader recruits other cloud members into the mobile vehicular micro cloud and distributes sub-tasks to the other cloud members for collaborative task execution.

In some scenarios, a vehicular micro cloud can be used to provide services to connected vehicles that are members of the vehicular micro cloud. These services are referred to herein as "cloudification services." These cloudification services include, for example, one or more of the following: dynamic map generation, cooperative path planning, and distributed data storage. In some embodiments, the members of the vehicular micro cloud can also offer services to members of other vehicular micro or macro clouds.

However, each vehicle that is a member of a vehicular micro cloud has a limited amount of resources that can be used by other members of the vehicular micro cloud. For example, each vehicle has limited amounts of the following onboard resources: central processing unit (CPU) power; memory; data storage; communication bandwidth; communication throughput; onboard sensors; and sensor data. Other members of the vehicular micro cloud may request cloudification services from members of the vehicular micro cloud that are referred to as "host vehicles." A host vehicle is a member of the vehicular micro cloud that fulfills a cloudification service request.

In some cases, other members of the vehicular micro cloud request numerous cloudification services to be performed at the same time or overlapping times by a host vehicle that is also a member of the vehicular micro cloud. If a particular cloudification service request for the host vehicle consumes too much onboard resources of the host vehicle, then fulfilling this particular cloudification service request can degrade the host vehicle's ability to fulfill the other cloudification services that are requested during the overlapping times. Experience shows that this issue may limit the real-world ability of using vehicular micro clouds to provide cloudification services.

For example, with reference to FIG. 1A, depicted is an example scenario 101 where a vehicle 110 in a vehicular micro cloud may host multiple cloudification services in parallel according to some embodiments. The vehicular micro cloud includes multiple vehicles that may communicate with one another via V2V communications and communicate with an edge server 140 via V2N communications. The edge server 140 may be communicatively coupled to a cloud server 160. The vehicular micro cloud includes a first group 102 of vehicles that are interested in providing a cloudification service A and a second group 103 of vehicles that are interested in providing a cloudification service B. The vehicle 110 is a member of both the group 102 and the group 103 and is interested in providing both the cloudification service A and the cloudification service B. For example, the vehicle 110 in the vehicular micro cloud may host multiple cloudification services such as dynamic map generation, cooperative path planning, distributed data storage, etc., in parallel. However, the vehicle 110 has a limited amount of resources that can be used for the cloudification services such as a limited amount of CPU power, memory, data storage, communication bandwidth and sensors, etc. If a certain cloudification service (e.g., the cloudification service A) consumes too much onboard resources of the vehicle 110, performance of other cloudification services (e.g., the cloudification service B) hosted by the vehicle 110 may be degraded. Thus, it is needed to coordinate a usage of onboard resources across multiple cloudification services to improve performance of the vehicle 110.

Embodiments described herein provide a solution that coordinates the use of resources across multiple host vehicles of a vehicular micro cloud so that multiple cloudification services can be provided by these host vehicles without degrading the fulfillment of other cloudification services that are simultaneously provided by these host vehicles.

As described in some embodiments herein, a vehicular micro cloud includes a set of connected vehicles that share their computing resources and computing services with one another. A computing resource includes, for example, memory capacity, processing power, network bandwidth, and any other type of computing resource. A computing service includes, for example, executing software for a connected vehicle, executing calculations for a connected vehicle, sending/receiving messages for a connected vehicle, finding digital data for a connected vehicle that is stored by any member of the vehicular micro cloud, getting many different members of the vehicular micro cloud to help a connected vehicle with calculations, etc.

In a vehicular micro cloud described herein, members of the vehicular micro cloud share computing resources and computing services with other members, and this is not implemented in a standard V2X communication. That is, a vehicular micro cloud described herein cannot be any two vehicles that merely communicate with one another via a V2X communication without sharing of the computing resources, the computing services, or a combination thereof.

As described herein, examples of Vehicle-to-Everything (V2X) communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X wireless message) described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message, a LTE-V2N message, etc.); a 5G-V2X message; and a millimeter wave message, etc.

Example Overview

Figure 1B:
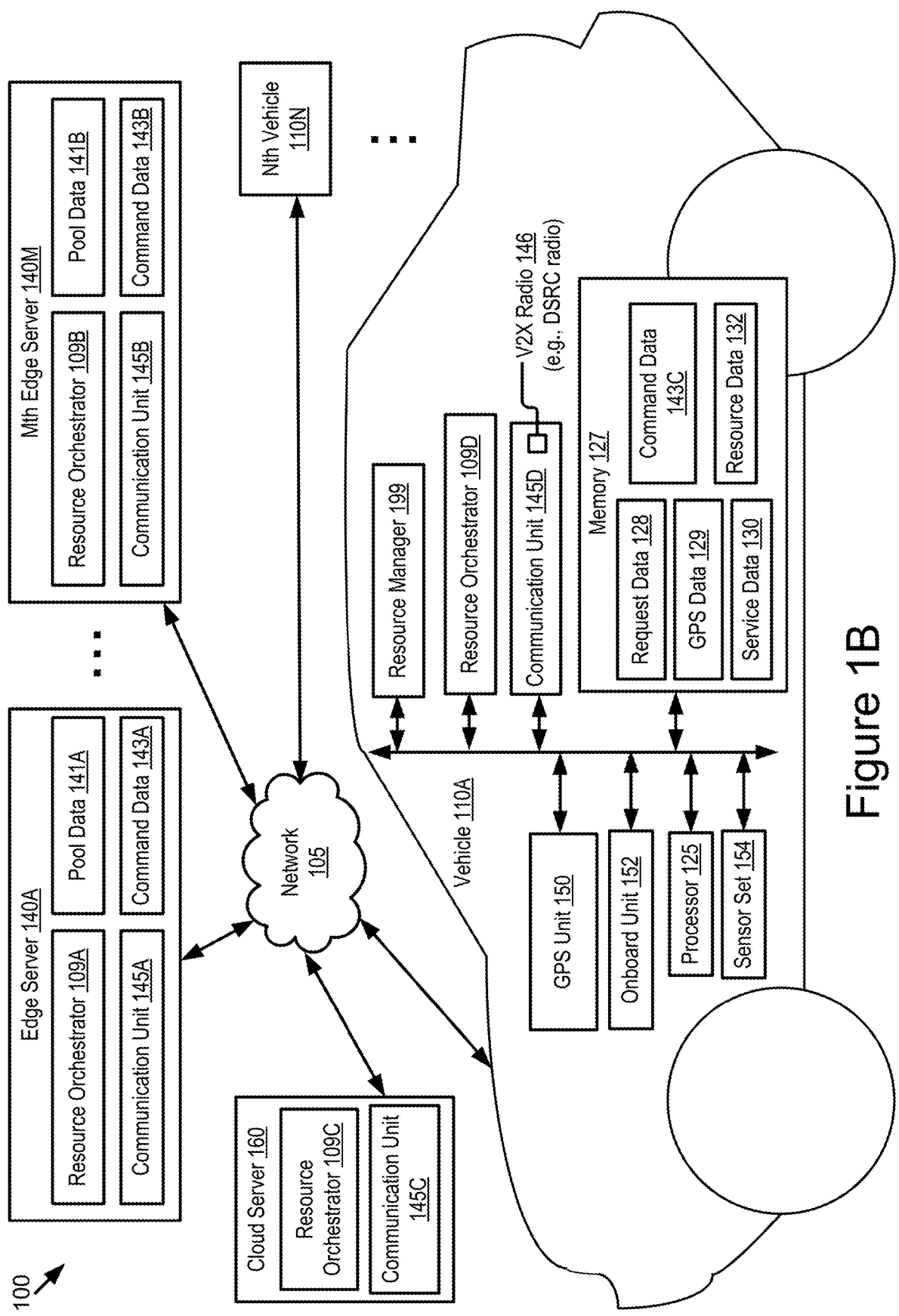
FIG. 1B is a block diagram illustrating an operating environment for a resource orchestrator and a resource manager according to some embodiments.

Referring to FIG. 1B, depicted is an example operating environment 100 for a resource manager 199 and a resource orchestrator 109 according to some embodiments. For example, the operating environment 100 includes one or more vehicles 110, one or more edge servers 140 and a cloud server 160. The one or more vehicles 110 include a first vehicle 110A, . . . , and an Nth vehicle 110N, which may provide similar functionality and are referred to herein as "vehicle 110" individually or collectively, where N is a positive integer greater than or equal to one. The one or more edge servers 140 includes a first edge server 140A, . . . , and an Mth edge server 140M, which may provide similar functionality and are referred to herein as "edge server 140" individually or collectively, where M is a positive integer greater than or equal to one. These elements of the operating environment 100 may be communicatively coupled to a network 105. Optionally, the operating environment 100 further includes one or more roadside units (RSUs if plural, and RSU if singular) or other infrastructure devices (not shown in the figure).

Although two vehicles 110, two edge servers 140, one cloud server 160 and one network 105 are depicted in FIG. 1B, in practice the operating environment 100 may include one or more vehicles 110, one or more edge servers 140, one or more cloud servers 160 and one or more networks 105.

For example, there are "N" number of vehicles nearby the vehicle 110 having the resource manager 199. However, it is not required that all of the "N" number of vehicles include a resource manager. Of course, in some embodiments each of the "N" vehicles can include a resource manager.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, LTE, LTE-V2V, LTE-V2I, LTE-V2X, LTE-D2D, VoLTE, 5G-V2X or any other mobile data network or combination of mobile data networks. Further, the network 105 may include one or more IEEE 802.11 wireless networks.

In some embodiments, the network 105 includes a V2X network (e.g., a V2X wireless network). The V2X network is a communication network that enables entities such as elements of the operating environment 100 to wirelessly communicate with one another via one or more of the following: Wi-Fi; cellular communication including 3G, 4G, LTE, 5G, etc.; Dedicated Short Range Communication (DSRC); millimeter wave communication; etc.

The edge server 140 includes a processor-based computing device which is installed in a roadside unit ("RSU") or some other processor-based infrastructure component of a roadway. In the operating environment 100 illustrated in FIG. 1B, the roadway includes M edge servers 140A . . . 140M, where M is any positive integer greater than or equal to one. The edge server 140A includes a resource orchestrator 109A and a communication unit 145A. The edge server 140A may also include a memory that stores one or more of pool data 141A and command data 143A. The edge server 140M includes a resource orchestrator 109B and a communication unit 145B. The edge server 140M may also include a memory that stores one or more of pool data 141M and command data 143M.

In some embodiments, edge servers 140 are not available. For example, roadside units may not be available in rural environments to serve as edge servers. Accordingly, the cloud server 160 can host an instance of a resource orchestrator (e.g., a resource orchestrator 109C) so that this cloud-based resource orchestrator can serve rural vehicles. Accordingly, embodiments described herein can be applied in urban environments as well as rural environments. The cloud server 160 may also include a communication unit 145C.

The communication units 145A, 145B and 145C (as well as a communication unit 145D in the vehicle 110) may have similar structure and provide similar functionality. Thus, the communication units 145A, 145B, 145C and 145D can be referred to as "communication unit 145" individually or collectively.

The communication unit 145 transmits and receives data to and from the network 105 or to another communication channel. In some embodiments, the communication unit 145 may include a DSRC transceiver, a DSRC receiver and other hardware or software necessary to make the corresponding connected endpoint a DSRC-enabled device. For example, the communication unit 145 includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 146 used for conducting V2X communications. For example, the V2X radio 146 includes a DSRC radio. In another example, the V2X radio 146 includes hardware, software, or a combination thereof for performing mmWave communications. Other examples of the V2X radio 146 are possible. It should be noted that DSRC is not a requirement here. Embodiments described herein can be implemented with any form of V2X communications.

The resource orchestrators 109A, 109B and 109C (as well as a resource orchestrator 109D installed in the vehicle 110) may have similar structure and provide similar functionality. Thus, the resource orchestrators 109A, 109B, 109C and 109D can be referred to as "resource orchestrator 109" individually or collectively.

Figure 1C:
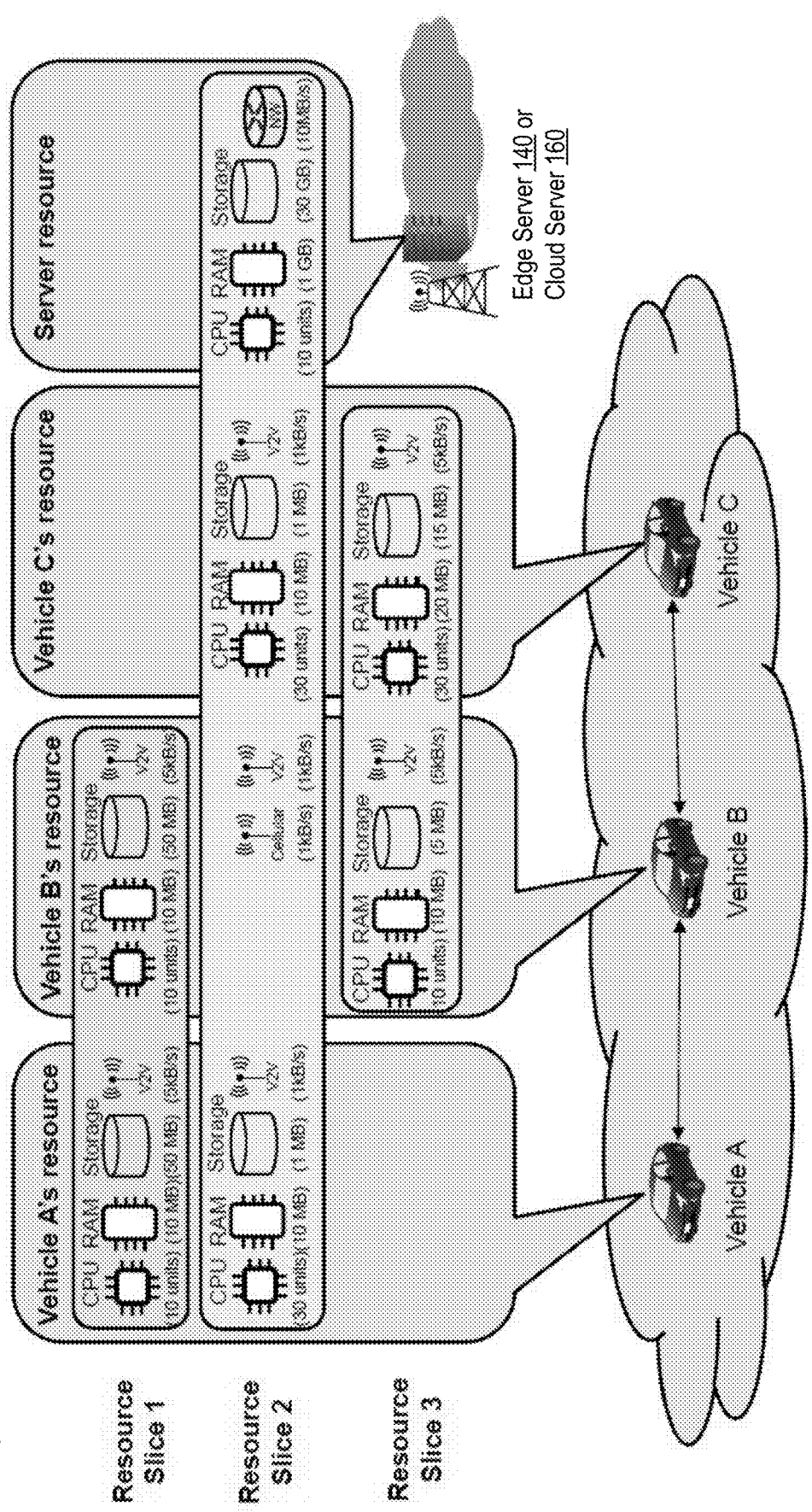
FIG. 1C is a graphic representation illustrating example resource slices according to some embodiments.

In some embodiments, the resource orchestrator 109 may be installed on one or more connected endpoints such as those depicted in FIG. 1B. Examples of a connected endpoint include, but are not limited to, the following: the vehicle 110; the edge server 140; the cloud server 160; and any other roadside unit or infrastructure device. The resource orchestrator 109 includes code and routines that are operable, when executed by a processor of a corresponding connected endpoint, to cause the processor to execute operations that use wireless messages to cooperate with resource managers 199 of various connected vehicles to: determine cloudification services that may be needed or requested in a vehicular cloud; determine computing resources that are available in the vehicular cloud; determine resources slices for providing the cloudification services; and generate commands that are sent to the resource managers 199 to implement and utilize these resource slices. Examples of resource slices are depicted in FIG. 1C.

In some embodiments, the resource orchestrator 109 may be implemented using hardware including a field-programmable gate array ("FPGA") or an application-specific integrated circuit ("ASIC"). In some other embodiments, the resource orchestrator 109 may be implemented using a combination of hardware and software. The resource orchestrator 109 may be stored in a combination of the devices (e.g., vehicles or other devices), or in one of the devices.

The resource orchestrator 109 is described below in more detail with reference to FIGS. 1C-1F and 5-6B.

The pool data 141A and the pool data 141B may provide similar functionality. Thus, the pool data 141A and 141B can be referred to as "pool data 141" individually or collectively. In some embodiments, the resource orchestrator 109 aggregates resource data and historical request data from many different vehicles. The pool data 141 includes digital data that describes resources and service requests that are available among the different vehicles that form a vehicular micro cloud that is managed by the resource orchestrator 109. In some embodiments, the pool data 141 describes a resource pool that maintains a record of resources available in the vehicular micro cloud for providing cloudification services. For example, the resource pool records onboard resources of various connected endpoints that can be reserved for providing one or more cloudification services.

The command data 143A and the command data 143B (as well as command data 143C stored in the vehicle 110) may provide similar functionality. Thus, the command data 143A, 143B and 143C can be referred to as "command data 143" individually or collectively. In some embodiments, the command data 143 describes commands to implement resource slices for provisioning cloudification services. For example, the command data 143 includes digital data describing resource slices that different host vehicles may implement. The command data 143 is determined by the resource orchestrator 109 based on an analysis of the pool data 141.

In some embodiments, the vehicle 110 may be a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by an Advanced Driver Assistance System (ADAS) of a modern vehicle require positioning information that describes the geographic position of the vehicle with lane-level accuracy. In addition, the current standard for DSRC requires that the geographic position of the vehicle be described with lane-level accuracy.

As used herein, the words "geographic location," "location," "geographic position" and "position" refer to a latitude and longitude of an object (or, a latitude, longitude, and elevation of an object) such as a connected vehicle. The example embodiments described herein provide positioning information that describes a geographic position of a vehicle with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

The vehicle 110 may be any type of vehicle. The vehicle 110 may be one of the following types of vehicles: a car; a truck; a sports utility vehicle; a bus; a semi-truck; a drone or any other roadway-based conveyance. In some embodiments, the vehicle 110 includes a communication unit such that the vehicle is a "connected vehicle," where the communication unit includes any hardware and software that is needed to enable the vehicle 110 to communicate with other entities via the network 105.

In some embodiments, the vehicle 110 may be an autonomous vehicle or a semi-autonomous vehicle. For example, the vehicle 110 may include one or more Advanced Driver-Assistance Systems (ADAS systems). The one or more ADAS systems may provide some or all of the functionality that provides autonomous functionality.

Figure 2:
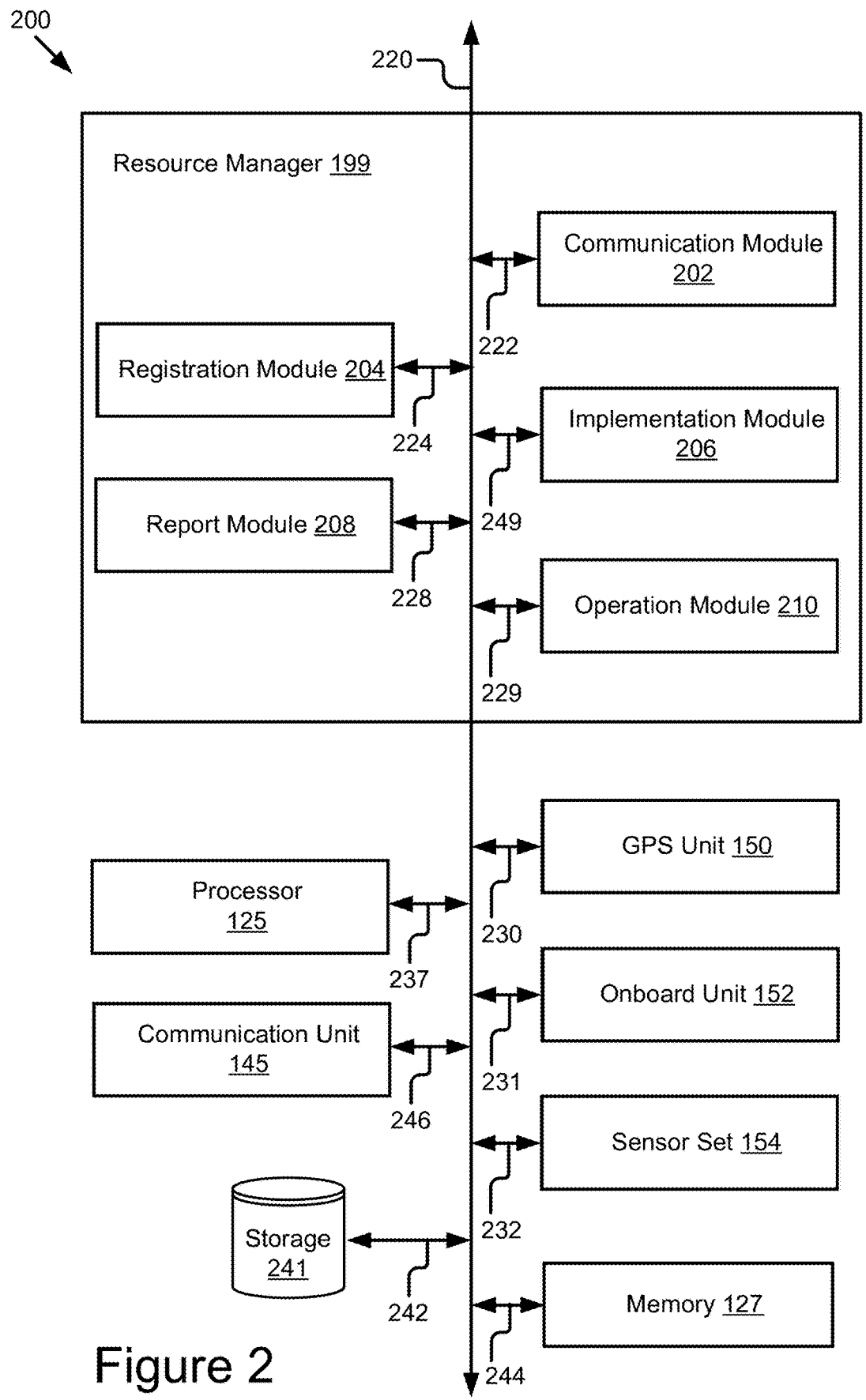
FIG. 2 is a block diagram illustrating an example computer system including a resource manager according to some embodiments.

In some embodiments, the vehicle 110 may be a host vehicle that fulfills a cloudification request (see, e.g., FIG. 2). In some embodiments, the vehicle 110 may host an instance of the resource orchestrator 109 (e.g., the resource orchestrator 109D) to provide at least part of the functionality of the resource orchestrator 109 described herein.

In some embodiments, the vehicle 110 includes the resource manager 199, the resource orchestrator 109, the communication unit 145, a processor 125, a memory 127, a GPS unit 150, an onboard unit 152 and a sensor set 154.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 110 may include one or more processors 125. Other processors, operating systems, sensors, displays, and physical configurations may be possible.

For example, the processor 125 can be an element of the onboard unit 152 or an electronic control unit of the vehicle 110.

The memory 127 stores instructions or data that may be executed by the processor 125 of the vehicle 110. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The vehicle 110 may include one or more memories 127.

In some embodiments, the memory 127 stores one or more of the following elements: request data 128; GPS data 129; service data 130; resource data 132; and command data 143.

The request data 128 describes a request for a cloudification service from another member of the vehicular micro cloud. For example, the request data 128 includes digital data that describes a cloudification service that is requested by another vehicular micro cloud member (e.g., one of the Nth vehicles 110).

The GPS data 129 includes digital data describing a geographic location of the vehicle 110.

The service data 130 includes digital data needed to provide a cloudification service to other members of the vehicular micro cloud.

The resource data 132 includes digital data that describes computing resources and cloudification services that are available from the vehicle 110. For example, the resource data 132 describes that the vehicle 110 can provide up to 30 units of CPU time, 20 MB of memory, 50 MB of data storage and 5 kB/s of communication bandwidth for a cloudification service.

In some embodiments, the GPS unit 150 is a conventional GPS unit of the vehicle 110. For example, the GPS unit 150 may include hardware that wirelessly communicates with a GPS satellite to retrieve data that describes a geographic location of the vehicle 110. For example, the GPS unit 150 retrieves GPS data from one or more GPS satellites. In some embodiments, the GPS unit 150 is a DSRC-compliant GPS unit of the vehicle 110 that is operable to provide GPS data describing the geographic location of the vehicle 110 with lane-level accuracy.

The onboard unit 152 can include one or more processors and one or more memories. For example, the onboard unit 152 includes an electronic control unit (ECU). The ECU is an embedded system in automotive electronics that controls one or more of electrical systems or subsystems in the vehicle 110. Types of the ECU include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the resource manager 199 of the vehicle 110 is installed in the onboard unit 152.

The sensor set 154 includes one or more sensors that are operable to measure a roadway environment outside of the vehicle 110. For example, the sensor set 154 may include one or more sensors that record one or more physical characteristics of the road environment that is proximate to the vehicle 110. The memory 127 may store sensor data that describes the one or more physical characteristics recorded by the sensor set 154. The roadway environment outside of the vehicle 110 may include the other vehicles (as well as other objects or people) in the operating environment 100, and so, one or more sensors of the sensor set 154 may record sensor data that describes information about the other vehicles (as well as other objects or people) in the operating environment 100.

In some embodiments, the sensor set 154 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

For example, the sensor set 154 includes any sensors which are needed to detect events occurring in the roadway environment that includes the vehicle 110. Examples of suitable sensors include, but are not limited one or more of the following: exterior mounted cameras; LIDAR; radar; and other range-finding sensors, etc.

The resource manager 199 may be installed on one or more of the connected endpoints depicted in FIG. 1B. As depicted, the resource manager 199 is installed in the vehicle 110 which may serve as a host vehicle for providing a cloudification service. The resource manager 199 includes code and routines that are operable, when executed by the processor 125 of the vehicle 110, to cause the processor 125 to execute operations that use wireless messages to implement resource slices determined by the resource orchestrator 109 and utilize these resource slices.

In some embodiments, the resource manager 199 may be implemented using hardware including a field-programmable gate array ("FPGA") or an application-specific integrated circuit ("ASIC"). In some other embodiments, the resource manager 199 may be implemented using a combination of hardware and software. The resource manager 199 may be stored in a combination of the devices (e.g., vehicles or other devices), or in one of the devices.

The resource manager 199 is described below in more detail with reference to FIGS. 1C-4B.

Referring to FIG. 1C, a graphical representation 165 of example resource slices is depicted according to some embodiments. The resource orchestrator 109 divides onboard resources (e.g., computational resources, communication resources) of connected endpoints (e.g., vehicles 110, cloud servers 160, edge servers 140 or a combination thereof) into multiple resource slices based on a resource pool described by the pool data 141. In some embodiments, a resource slice describes one or more sets of onboard resources to be reserved by one or more connected endpoints respectively so that resource usages across the one or more connected endpoints are coordinated based on the resource slice to improve performance of the one or more connected endpoints.

In some embodiments, a resource slice is configured to host a single cloudification service by one or more connected endpoints so that resource usages across the one or more connected endpoints are coordinated based on the resource slice to provide the single cloudification service. In some other embodiments, a resource slice is configured to host a group of cloudification services simultaneously across one or more connected endpoints in the vehicular micro cloud so that the resource usages across the one or more connected endpoints are coordinated based on the resource slice to provision the group of cloudification services simultaneously.

With respect to each connected endpoint included in a resource slice, the resource slice describes a set of onboard resources to be reserved by the connected endpoint. For example, the resource slice describes a resource type and a reservation amount of each onboard resource in the set of onboard resources to be reserved by the connected endpoint. When the resource manager 199 of the connected endpoint provides the set of onboard resources to execute one or more tasks for a cloudification service, an amount of each onboard resource consumed by an execution of the one or more tasks is not greater than the reservation amount of the corresponding onboard resource indicated by the resource slice. In some embodiments, a geographical location of the set of onboard resources is identical to a geographic location of the connected endpoint. The geographical location of the set of onboard resources may change over time due to a mobility of the connected endpoint.

For example, with reference to FIG. 1C, three resource slices (resource slice 1, resource slice 2 and resource slice 3) are created by the resource orchestrator 109. Each resource slice can reserve a certain proportion of resources available in each computational entity (e.g., vehicles A, B and C, a cloud server 160 or an edge server 140). The resource slice cannot consume more than the reserved resources.

For example, the resource slice 1 includes onboard resources of vehicles A and B. The vehicle A can use up to 10 units of CPU time for the cloudification service(s) in the resource slice 1 (e.g., 1 unit of CPU time=a CPU time normalized by processing power). The vehicle A can use up to 10 MB of memory for the cloudification service(s) in the resource slice 1. The vehicle A can use up to 50 MB of data storage for the cloudification service(s) in the resource slice 1. The vehicle A can send up to 5 kB/s of V2V data for the cloudification service(s) in the resource slice 1.

It is also possible to incorporate onboard resources of cloud servers or edge servers into a resource slice. For example, the resource slice 2 can be used to reserve up to: (1) 30 units of CPU time, 10 MB of memory, 1 MB of data storage and 1 kB/s of V2V data in the vehicle A for the cloudification service(s); (2) 1 kB/s cellular data and 1 kB/s of V2V data in the vehicle B for the cloudification service(s); (3) 30 units of CPU time, 10 MB of memory, 1 MB of data storage and 1 kB/s of V2V data in the vehicle C for the cloudification service(s); and (4) 10 units of CPU time, 1 GB of memory, 30 GB of data storage and 10 MB/s of network data in the edge server 140 or the cloud server 160 for the cloudification service(s). Here, the vehicles A, B and C may be members of a vehicular cloud (e.g., a vehicular micro cloud or a vehicular macro cloud).

Figure 1D:
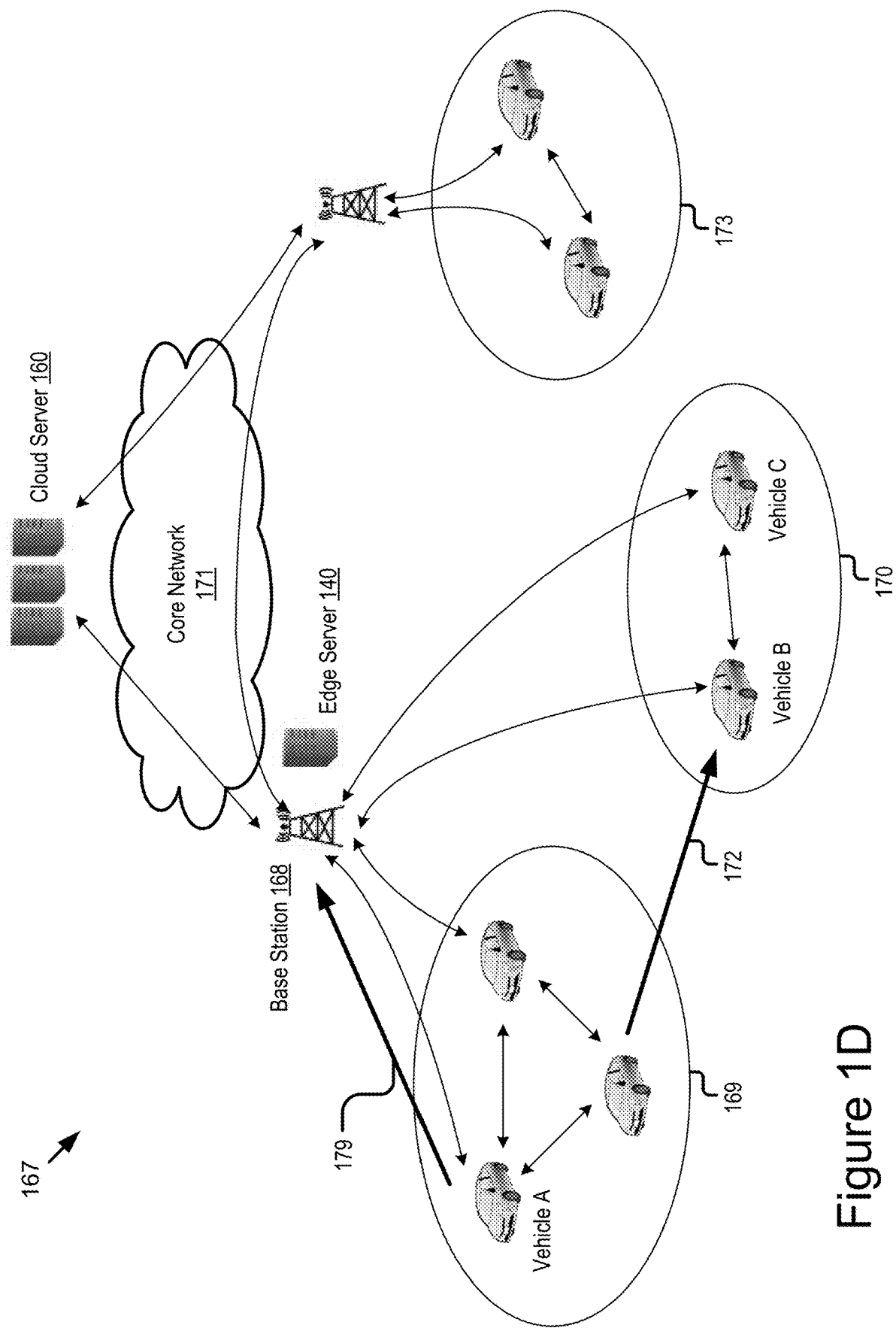
FIG. 1D is a graphic representation illustrating an example flow process to utilize a resource slice to provide a cloudification service according to some embodiments.

FIG. 1D is a graphic representation illustrating an example flow process 167 to utilize a resource slice to provide a cloudification service according to some embodiments. In FIG. 1D, the cloud server 160 is communicatively coupled to the edge server 140 via a base station 168 and a core network 171. The core network 171 can be an example of the network 105. The edge server 140 manages geographical regions where vehicular micro clouds 169 and 170 are located.

Assume that the resource slice includes onboard resources reserved by the cloud server 160, the edge server 140 and vehicles in the vehicular micro clouds 169 and 170. Once the resource slice is created, the resource orchestrator 109 installed in the edge server 140 or the cloud server 160 can issue commands to assign tasks to appropriate onboard resources in the resource slice for execution.

Assume that a vehicle A in the vehicular micro cloud 169 receives a request to execute a new task from another vehicle. Upon arrival of the new task, the vehicle A sends meta data of the task to the edge server 140 (or the cloud server 160) to inquire whether the task is to be executed locally by the vehicular micro cloud 169 or handed over to another entity for execution (see, e.g., a flow illustrated with a reference number 179).

The resource orchestrator 109 of the edge server 140 may determine an entity to host the task. For example, the resource orchestrator 109 of the edge server 140 may determine to execute the task locally in the vehicular micro cloud 169. In another example, the resource orchestrator 109 of the edge server 140 may instruct the vehicular micro cloud 169 to delegate the task to another entity such as the cloud server 160, the edge server 140 or the vehicular micro cloud 170 because performance of the vehicular micro cloud 169 is degraded due to a resource shortage. Here, assume that the resource orchestrator 109 of the edge server 140 instructs the vehicular micro cloud 169 to hand over the task to the vehicular micro cloud 170 because the vehicular micro cloud 170 has sufficient resources to execute the task.

Then, members of the vehicular micro cloud 169 transfers a description of the task (e.g., program code) along with relevant data if there is any to the vehicular micro cloud 170 over a V2V network or a V2I network (see, e.g., a flow illustrated with a reference number 172). The vehicular micro cloud 170 starts to execute the task based on the resource slice. For example, assume that the resource slice reserves a first set of onboard resources on a vehicle B and a second set of onboard resources on a vehicle C of the vehicular micro cloud 170. Then, the vehicle B and the vehicle C may cooperate with one another to execute the task in the vehicular micro cloud 170 by using the first set of onboard resources on the vehicle B and the second set of onboard resources on the vehicle C.

The resource orchestrator 109 of the edge server 140 monitors a progress of the task execution and may instruct the vehicular micro cloud 170 to suspend the task execution when performance of the vehicular micro cloud 170 is degraded due to, e.g., a resource shortage. The resource orchestrator 109 of the edge server 140 may instruct the vehicular micro cloud 170 to hand over the task to another entity for execution (e.g., a vehicular micro cloud 173).

Figure 1E:
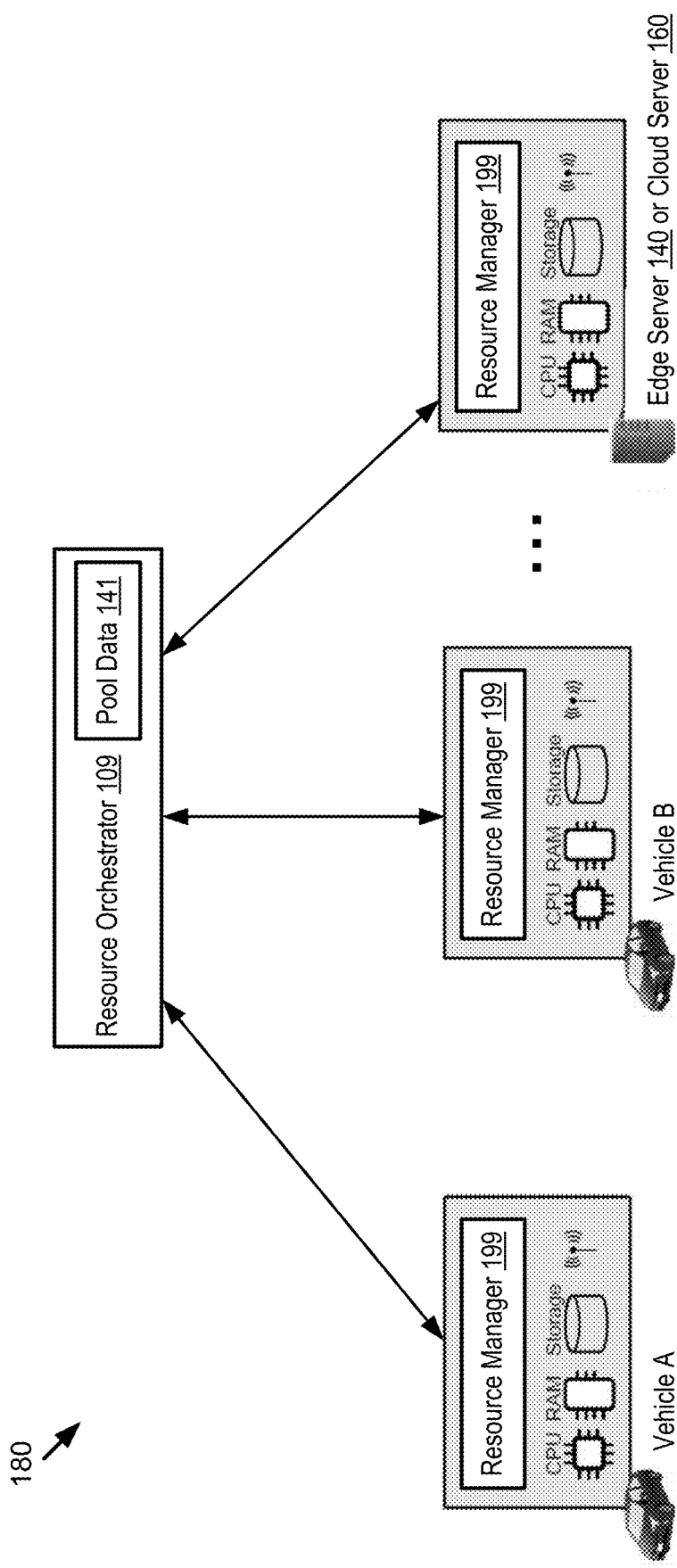
FIG. 1E is a graphic representation illustrating an example architecture including a resource orchestrator and multiple resource managers according to some embodiments.

FIG. 1E is a graphic representation illustrating an example architecture 180 including the resource orchestrator 109 and multiple resource managers 199 according to some embodiments. The architecture 180 implements a single tier architecture for the resource orchestrator 109. As shown in FIG. 1E, each connected endpoint or computational entity (i.e., vehicles A and B, the edge server 140 or cloud server 160) has an instance of the resource manager 199, which manages virtualized resources on a corresponding physical machine. Each resource manager 199 of a corresponding connected endpoint registers its associated onboard resources, which the corresponding connected endpoint can contribute to one or more cloudification services, to the resource orchestrator 109.

In some embodiments, the resource orchestrator 109 includes a resource pool that is described by the pool data 141. The resource pool maintains onboard resources available at each connected endpoint as well as geographical locations of these onboard resources.

In some embodiments, the resource orchestrator 109 may assign a subset of the onboard resources that are available at various connected endpoints and registered in the resource pool to form a resource slice. Specifically, the resource orchestrator 109 may select onboard resources of a set of connected endpoints from the resource pool to form a resource slice.

For example, the resource orchestrator 109 creates, based on the resource pool, a resource slice that satisfies one or more of the following slice determination parameters: (1) a constraint of a geographical region where a provisioning of a cloudification service is located (e.g., a geographical constraint indicating a geographical region where the vehicle-based resources are to be located, where the geographical region can be specified either by absolute coordinates or by relative coordinates with respect to a certain vehicle's position); (2) one or more resource requirements related to the provisioning of the cloudification service (e.g., a requirement on CPU time, memory, data storage, communication bandwidth, etc.); (3) one or more resource attributes defined in a standard (e.g., attributes defined in European Telecommunication Standards Institute Network Functions Virtualization (ETSI NFV)); and (4) a slice priority attribute (e.g., a priority label which can be used to determine which resource slice(s) to abort when resources are scarce).

In another example, if there are multiple candidate resources in the resource pool that can be incorporated into a resource slice, the resource orchestrator 109 may select a subset of the multiple candidate resources to be incorporated into the resource slice based on one or more pre-defined resource selection policies. Examples of a resource selection policy include, but are not limited to, one or more of the following: (1) a selection of connected endpoints that are expected to remain in a designated geographical region for a period of time that exceeds a threshold (e.g., a selection of vehicles that are expected to stay in a geographical region where a cloudification service is requested for the longest period of time); (2) a selection of connected endpoints that are uniformly distributed over the designated geographical region such that the resources in the resource slice are also uniformly distributed over the designated geographical region; (3) a selection of connected endpoints that have the highest amounts of available resources; and (4) a selection of connected endpoints that have the best task-execution performance based on historical records on task execution. Other example resource selection policies are possible.

After creating the resource slice, the resource orchestrator 109 may instruct each resource manager 199 of the set of connected endpoints to reserve a corresponding amount of onboard resources specified in the resource slice. When a particular resource in the resource slice becomes unavailable (e.g., a vehicle-based resource becomes unavailable because (1) the vehicle leaves a geographic region where a cloudification service is provided or (2) a performance of the vehicle-based resource degrades significantly), the resource orchestrator 109 may allocate an alternative resource from the resource pool to replace the unavailable resource and may update the resource slice accordingly.

In some embodiments, the resource orchestrator 109 can be hosted by the cloud server 160, the edge server 140 or a member of the vehicular micro cloud (e.g., a leader vehicle in the vehicular micro cloud). In some embodiments, the resource orchestrator 109 can be hosted by multiple connected endpoints in a distributed manner.

In some embodiments, in order to manage resource slices in a robust manner, the resource orchestrator 109 needs to keep information in its resource pool up-to-date. For example, the resource orchestrator 109 needs to query availability of resources and positions of the connected endpoints that provide the resources at a high frequency, because some connected endpoints such as vehicles in a certain geographical region usually move away from the geographical region in a short period of time (which leads to a difficulty to reach their resources over V2V networks). Besides, collection of the position information and resource availability information may cause non-negligible communication overhead, especially when the resource orchestrator 109 is hosted by a vehicle or server at a distant location. For example, frequent collection of the position information and resource availability information from various resource managers 199 may occupy a significant amount of communication bandwidth that is allocated to the resource orchestrator 109. To reduce the communication overhead, the functionality of the resource orchestrator 109 can be implemented in a hierarchical manner as illustrated in FIG. 1F.

Figure 1F:
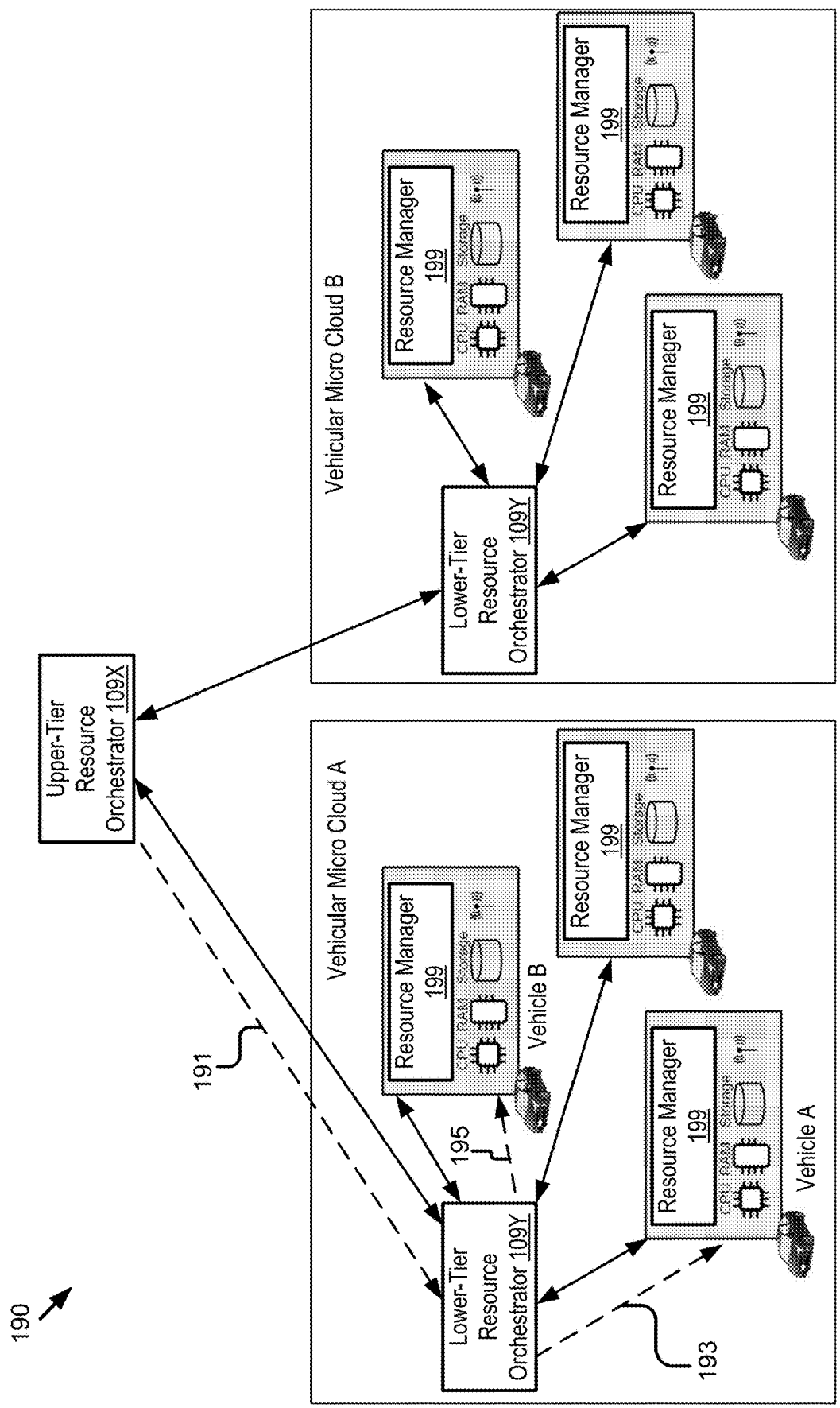
FIG. 1F is a graphic representation illustrating another example architecture including a resource orchestrator and multiple resource managers according to some embodiments.

Referring to FIG. 1F, an example architecture 190 that includes (1) the resource orchestrator 109 with a multi-tier structure and (2) multiple resource managers 199 is illustrated according to some embodiments. In FIG. 1F, the functionality of the resource orchestrator 109 is separated into two tiers: an upper-tier resource orchestrator 109X; and a lower-tier resource orchestrator 109Y located in each vehicular micro cloud. It should be noted that the functionality of the resource orchestrator 109 can be separated into any number of tiers, which is not limited herein.

In some embodiments, each lower-tier resource orchestrator 109Y is hosted by a member of a corresponding vehicular micro cloud and locally manages positions and resource availability of members of the vehicular micro cloud. For example, the lower-tier resource orchestrator 109Y can build a local lower-tier resource pool that maintains a list of resources available in the vehicular micro cloud and positions of the resources (e.g., positions of member vehicles that provide the available resources). The lower-tier resource orchestrator 109Y may upload pool data describing its lower-tier resource pool to the upper-tier resource orchestrator 109X. In this way, the upper-tier resource orchestrator 109X may build its upper-tier resource pool based on various lower-tier resource pools built by various lower-tier resource orchestrators 109Y.

In some embodiments, each lower-tier resource orchestrator 109Y reports an update of its lower-tier resource pool to the upper-tier resource orchestrator 109X when a change that occurs to the lower-tier resource pool satisfies an update threshold. For example, the lower-tier orchestrator 109Y reports a total amount of resources available in its vehicular micro cloud and positions of the resources to the upper-tier resource orchestrator 109X when: (1) the positions of the resources change more than a location threshold since a last transmission of the report (e.g., 20% of the resources have left a geographical region where a cloudification service is provided); or (2) the total amount of available resources changes more than a pre-defined threshold since the last transmission of the report (e.g., the total amount of available resources has reduced or increased by 10%).

In some embodiments, the upper-tier resource orchestrator 109X treats each group of member vehicles in a vehicular micro cloud as a single virtual computational entity. When creating a new resource slice, the upper-tier resource orchestrator 109X requests a corresponding lower-tier resource orchestrator 109Y for a total amount of resources that it wants to reserve in the vehicular micro cloud. The lower-tier resource orchestrator 109Y then looks up its local lower-tier resource pool and identifies an appropriate set of member vehicles (as resource providers) in the vehicular micro cloud such that the resources requested by the upper-tier resource orchestrator 109X are secured in the vehicular micro cloud.

In some embodiments, if any member vehicle leaves the vehicular micro cloud which may cause one or more resources to become unavailable, then the lower-tier resource orchestrator 109Y allocates alternative resources in the vehicular micro cloud to replace the unavailable resources without intervention by the upper-lower resource orchestrator 109X.

Now turning to FIG. 1F, a first lower-tier resource orchestrator 109Y is hosted by a vehicular micro cloud A. For example, the first lower-tier resource orchestrator 109Y is hosted by a leader vehicle of the vehicular micro cloud A. The first lower-tier resource orchestrator 109Y is communicatively coupled to the resource managers 199 that are installed in member vehicles of the vehicular micro cloud A. The first lower-tier resource orchestrator 109Y is also communicatively coupled to the upper-tier resource orchestrator 109X.

Similarly, a second lower-tier resource orchestrator 109Y is hosted by a vehicular micro cloud B. For example, the second lower-tier resource orchestrator 109Y is hosted by a leader vehicle of the vehicular micro cloud B. The second lower-tier resource orchestrator 109Y is communicatively coupled to the resource managers 199 that are installed in member vehicles of the vehicular micro cloud B. The second lower-tier resource orchestrator 109Y is also communicatively coupled to the upper-tier resource orchestrator 109X.

By way of examples, assume that the upper-tier resource orchestrator 109X requests 100 units of CPU time for providing cloudification services (as illustrated by a request 191) from the first lower-tier resource orchestrator 109Y. The first lower-tier resource orchestrator 109Y selects vehicles A and B in its vehicular micro cloud to provide the 100 units of CPU time based on its local lower-tier resource pool. For example, if the lower-tier resource pool indicates that the vehicles A and B have the highest amounts of available CPU time in the vehicular micro cloud A, then the lower-tier resource orchestrator 109Y selects the vehicles A and B to provide the 100 units of CPU time. For example, the lower-tier resource orchestrator 109Y of the vehicular micro cloud A sends a first request 193 to the resource manager 199 of the vehicle A to request a reservation of 60 units of CPU time and a second request 195 to the resource manager 199 of the vehicle B to request a reservation of 40 units of CPU time. In this way, the request for the 100 units of CPU time by the upper-lower resource orchestrator 109X is fulfilled by the vehicles A and B in the vehicular micro cloud A.

An example advantage of the hierarchical resource orchestration illustrated in FIG. 1F includes an improvement of scalability. For example, the upper-tier resource orchestrator 109X does not have to collect resource positions and resource availability information from every member vehicle of a vehicular micro cloud one by one. Instead, the upper-tier resource orchestrator 109X only manages resources positions and a total amount of the available resources of each vehicular micro cloud that are received from the lower-tier resource manager 109Y as a whole.

Another example advantage of the hierarchical resource orchestration illustrated in FIG. 1F includes a reduction of communication overhead. For example, since the lower-tier resource orchestrator 109Y is hosted by one or more member vehicles in a vehicular micro cloud, every member vehicle of the vehicular micro cloud can reach the lower-tier resource orchestrator 109Y typically by up to a few hops of V2V communications. There is no need to rely on V2I/V2N communications (or V2V data forwarding over many hops) for data collection. In another example, the lower-tier resource orchestrator 109Y sends an update notification to the upper-tier resource orchestrator 109X when (1) the positions of the available resources change more than a location threshold or (2) the total amount of available resources changes more than a pre-defined threshold. Any minor variation of resource availability in the vehicular micro cloud is handled by the lower-tier resource orchestrator 109Y without any intervention by the upper-tier resource orchestrator 109X.

With combined reference to FIGS. 1B-1F described above as well as FIGS. 2-6B described below, example advantages of the embodiments described herein include that: (1) an extension of a network slicing concept that is originally designed for mobile networks is provided; (2) onboard computation resources, communication resources or a combination thereof of a vehicle (referred to as vehicle-based resources) are incorporated into a resource slice; and (3) unlike a network slicing architecture, locations of the vehicle-based resources change over time due to mobility of the vehicle, and so, a mechanism to handle mobility of the vehicle-based resources is also provided.

Another example advantage of the embodiments described herein includes an implementation of a hierarchical resource orchestration. In this hierarchical resource orchestration, a group of vehicles and servers can be treated as a single virtual computational entity so that their resources can be efficiently managed in a hierarchical manner. Other example advantages are possible.

Example Computer System

Referring now to FIG. 2, depicted is a block diagram illustrating an example computer system 200 including the resource manager 199 installed in a connected endpoint according to some embodiments. In some embodiments, the computer system 200 may include a special-purpose computer system that is programmed to perform one or more steps of methods 300 and 400 described below with reference to FIGS. 3-4B.

In some embodiments, the connected endpoint with the resource manager 199 is the vehicle 110, and the computer system 200 is an on-board vehicle computer of the vehicle 110, an onboard unit of the vehicle 110, an electronic control unit (ECU), head unit or some other processor-based computing device of the vehicle 110. In some other embodiments, the connected endpoint with the resource manager 199 can be any other endpoint in the roadway environment. For simplicity and convenience of description, the following description of FIG. 2 assumes that the connected endpoint is the vehicle 110 without loss of generality.

The computer system 200 may include one or more of the following elements according to some examples: the resource manager 199; the processor 125; the memory 127; the communication unit 145; the GPS unit 150; the onboard unit 152; the sensor set 154; and a storage 241. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The GPS unit 150 is communicatively coupled to the bus 220 via a signal line 230. The onboard unit 152 is communicatively coupled to the bus 220 via a signal line 231. The sensor set 154 is communicatively coupled to the bus 220 via a signal line 232. The storage 241 is communicatively coupled to the bus 220 via a signal line 242. The memory 127 is communicatively coupled to the bus 220 via a signal line 244.

The processor 125, the memory 127, the communication unit 145, the GPS unit 150, the onboard unit 152 and the sensor set 154 are described above with reference to FIG. 1B, and so, similar description will not be repeated here. The memory 127 may store any of the data described above with reference to FIGS. 1B-1F. The memory 127 may store any data necessary for the computer system 200 to provide its functionality.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the resource manager 199 includes: a communication module 202; a registration module 204; an implementation module 206; a report module 208; and an operation module 210. These components of the resource manager 199 are communicatively coupled to each other via the bus 220. In some embodiments, components of the resource manager 199 can be stored in a single device. In some other embodiments, components of the resource manager 199 can be distributed and stored across multiple devices.

The communication module 202 can be software including routines for handling communications between the resource manager 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. For example, the communication module 202 receives or transmits, via the communication unit 145, one or more of the following elements: command data; and resource data. The communication module 202 may send or receive any of the data or messages described above with reference to FIGS. 1B-1F via the communication unit 145.

In some embodiments, the communication module 202 receives data from components of the resource manager 199 and stores the data in one or more of the storage 241 and the memory 127. For example, the communication module 202 receives data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the resource manager 199. For example, the communication module 202 may handle communications among the registration module 204, the implementation module 206, the report module 208 and the operation module 210. Any of these systems or modules may cause the communication module 202 to communicate with the other elements of the computer system 200 or the operating environment 100 (via the communication unit 145).

In some embodiments, the registration module 204 can be software including routines for registering onboard resources that are available on the connected endpoint. In some embodiments, the registration module 204 can be a set of instructions stored in the memory 127 of the computer system 200 and can be accessible and executable by the processor 125. The registration module 204 may be adapted for cooperation and communication with the processor 125 and other components of the computer system 200 via a signal line 224.

In some embodiments, the registration module 204 is operable to register onboard resources that are available on the connected endpoint to the resource orchestrator 109 (or a lower-tier resource orchestrator 109 that manages the available resources of the connected endpoint). For example, the registration module 204 reports a geographical location of the connected endpoint and an amount of each available onboard resource to the resource orchestrator 109. In some embodiments, a registration of the available onboard resources to the resource orchestrator 109 causes the resource orchestrator 109 to keep the available onboard resources in a resource pool and to determine a resource slice based on the resource pool.

The implementation module 206 can be software including routines that, when executed by the processor 125, cause the processor 125 to implement a resource slice for providing a cloudification server. In some embodiments, the implementation module 206 can be a set of instructions stored in the memory 127 of the computer system 200 and can be accessible and executable by the processor 125. The implementation module 206 may be adapted for cooperation and communication with the processor 125 and other components of the computer system 200 via a signal line 249.

In some embodiments, the implementation module 206 receives a V2X message that includes a command to implement a resource slice for provisioning a cloudification service from the resource orchestrator 109 via the communication unit 145. The resource slice describes, for example, a set of onboard resources to be reserved by the connected endpoint for provisioning the cloudification service (e.g., the resource slice describes a resource type and a reservation amount of each onboard resource to be reserved by the connected endpoint). In some embodiments, the resource slice satisfies one or more slice determination parameters that include one or more of the following: a constraint of a geographical region where the provisioning of the cloudification service is located; one or more resource requirements related to the provisioning of the cloudification service; one or more resource attributes defined in a standard; and a slice priority attribute.

In some embodiments, the implementation module 206 provides the set of onboard resources of the connected endpoint to execute one or more tasks for the cloudification service based on the resource slice so that a resource usage of the connected endpoint is coordinated based on the resource slice to improve performance of the connected endpoint. For example, an amount of each onboard resource consumed by an execution of the one or more tasks is not greater than the reservation amount of the corresponding onboard resource indicated by the resource slice so that the execution of the one or more tasks for the cloudification service does not affect the connected endpoint's execution of other tasks for other cloudification services. That is, a coordination of the resource usage based on the resource slice can ensure that the connected endpoint can provide the cloudification service without degrading fulfillment of other cloudification services that are simultaneously provided by the connected endpoint.

In some embodiments, the resource slice describes multiple sets of onboard resources to be reserved by multiple connected endpoints so that resource usages across the multiple connected endpoints are coordinated based on the resource slice to improve performance of the multiple connected endpoints. For example, the resource slice is configured to host a group of cloudification services simultaneously in a vehicular micro cloud so that the resource usages across the multiple connected endpoints are coordinated based on the resource slice to provision the group of cloudification services simultaneously.

The report module 208 can be software including routines that, when executed by the processor 125, cause the processor 125 to report an update on onboard resources of the connected endpoint. In some embodiments, the report module 208 can be a set of instructions stored in the memory 127 of the computer system 200 and can be accessible and executable by the processor 125. The report module 208 may be adapted for cooperation and communication with the processor 125 and other components of the computer system 200 via a signal line 228.

In some embodiments, a geographical location of onboard resources of the connected endpoint changes over time due to a mobility of the connected endpoint. The report module 208 receives a resource query from the resource orchestrator 109. Responsive to the resource query, the report module 208 reports an update on one or more of (1) an availability of the onboard resources and (2) a geographical location of the connected endpoint (e.g., a geographical location of the onboard resources) to the resource orchestrator 109, where a report of the update causes the resource orchestrator 109 to update its resource pool as well as the resource slice.

In some embodiments, the report module 208 may report an update on one or more of (1) the availability of the onboard resources and (2) the geographical location of the connected endpoint to the resource orchestrator 109 periodically.

In some embodiments, the report module 208 may report an update on one or more of (1) the availability of the onboard resources and (2) the geographical location of the connected endpoint to the resource orchestrator 109 when an update threshold is satisfied. For example, the report module 208 reports an update on a total amount of resources available on the connected endpoint and a position of the resources to the resource orchestrator 109 when: (1) the position of the resources changes more than a location threshold (e.g., a location of the resources has changed for a certain distance threshold); or (2) the total amount of available resources changes more than a pre-defined threshold (e.g., the total amount of available resources has reduced or increased by 5%).

In some embodiments, the report module 208 determines that the set of onboard resources reserved via the resource slice becomes unavailable on the connected endpoint. For example, due to (1) a degradation of task-execution performance in the connected endpoint or (2) a mobility of the connected endpoint such that the connected endpoint leaves a geographic region where the cloudification service is provided, the report module 208 determines that the set of onboard resources are no longer available on the connected endpoint.

Then, the report module 208 reports an unavailability of the set of onboard resources to the resource orchestrator 109, where a report of the unavailability causes the resource orchestrator 109 to update the resource pool and the resource slice based on the unavailability of the set of onboard resources. The resource orchestrator 109 may issue an instruction to the connected endpoint to hand over an execution of the one or more tasks to another connected endpoint. Responsive to receiving the instruction from the resource orchestrator 109, the report module 208 may hand over the execution of the one or more tasks to the other connected endpoint.

The operation module 210 can be software including routines that, when executed by the processor 125, cause the processor 125 to modify an operation of the communication unit 145 of the connected endpoint to transmit or receive data via the communication unit 145. In some embodiments, the operation module 210 can be a set of instructions stored in the memory 127 of the computer system 200 and can be accessible and executable by the processor 125. The operation module 210 may be adapted for cooperation and communication with the processor 125 and other components of the computer system 200 via a signal line 229.

In some embodiments, the operation module 210 modifies an operation of the communication unit 145 of the connected endpoint to receive a V2X message that includes a command to implement a resource slice for provisioning a cloudification service from the resource orchestrator 109. For example, the operation module 210 modifies an operation element of the communication unit 145 of the connected endpoint to receive the V2X message that includes the command, where the command causes the connected endpoint to reserve a set of onboard resources for providing the cloudification service based on the resource slice.

In some embodiments, the operation module 210 modifies the operation of the communication unit 145 of the connected endpoint to transmit a resource registration, a resource unavailability message, or a resource update of the connected endpoint to the resource orchestrator 109. For example, the operation module 210 modifies an operation element of the communication unit 145 of the connected endpoint to transmit a resource registration, a resource unavailability message or a resource update of the connected endpoint to the resource orchestrator 109, where each of the resource registration, the resource unavailability message and the resource update may cause the resource orchestrator 109 to update its resource pool (as well as the resource slice if applicable).

In some embodiments, an operation element of the communication unit 145 includes one or more of the following: one or more active V2X channels to be operated on the communication unit 145; one or more active V2X radios to be operated on the communication unit 145; one or more active V2X antennas to be operated on the communication unit 145; one or more operating frequencies of the one or more active V2X channels; one or more beamforming techniques performed on the one or more active V2X antennas; and a bandwidth allocation scheme of the communication unit 145.

For example, when (1) receiving the V2X message including the command from the resource orchestrator 109 or (2) sending the resource registration, the resource unavailability message or the resource update to the resource orchestrator 109, the operation module 210 can modify one or more of the following operation elements of the communication unit 145: (1) increasing the number of active V2X channels so that more V2X channels can be used to communicate with nearby vehicles simultaneously; (2) changing a beamforming technique applied on one or more V2X antennas so that a signal transmitted to a nearby vehicle with a farther distance may have a higher signal strength; and (3) allocating more bandwidth to the communication unit 145 so that data can be exchanged with other nearby vehicles with a faster speed. In this way, communication efficiency in the vehicular micro cloud can be improved.

In some embodiments, the connected endpoint also includes a lower-tier resource orchestrator 109 in the vehicular micro cloud. The lower-tier resource orchestrator 109 includes code and routines that, when executed by the processor 125, cause the processor 125 to perform one or more of the following operations: managing positions and resource availability of members in the vehicular micro cloud; and reporting the positions and the resource availability of the members in the vehicular micro cloud to an upper-tier resource orchestrator 109 (see, e.g., FIG. 1F).

In some embodiments, the lower-tier resource orchestrator 109 is also operable to receive a request from the upper-tier resource orchestrator 109 to reserve one or more resources in the vehicular micro cloud. The lower-tier resource orchestrator 109 identifies a set of members in the vehicular micro cloud for providing the one or more resources requested by the upper-tier resource orchestrator 109 based on a local lower-tier resource pool managed by the connected endpoint so that a provisioning of the one or more resources requested by the upper-tier resource orchestrator 109 is guaranteed in the vehicular micro cloud.

For example, if the lower-tier resource pool indicates that vehicles A and B have the highest amounts of the one or more resources available in the vehicular micro cloud, then the lower-tier resource orchestrator 109 selects the vehicles A and B to provide the one or more resources requested by the upper-tier resource orchestrator 109. The lower-tier resource orchestrator 109 may also create a lower-tier resource slice accordingly and send the lower-tier resource slice to the vehicles A and B for reservation of the one or more resources on the vehicles A and B. The lower-tier resource slice may have a structure similar to those resource slices depicted in FIG. 1C, and similar description is not repeated here.

Example Processes

Figure 3:
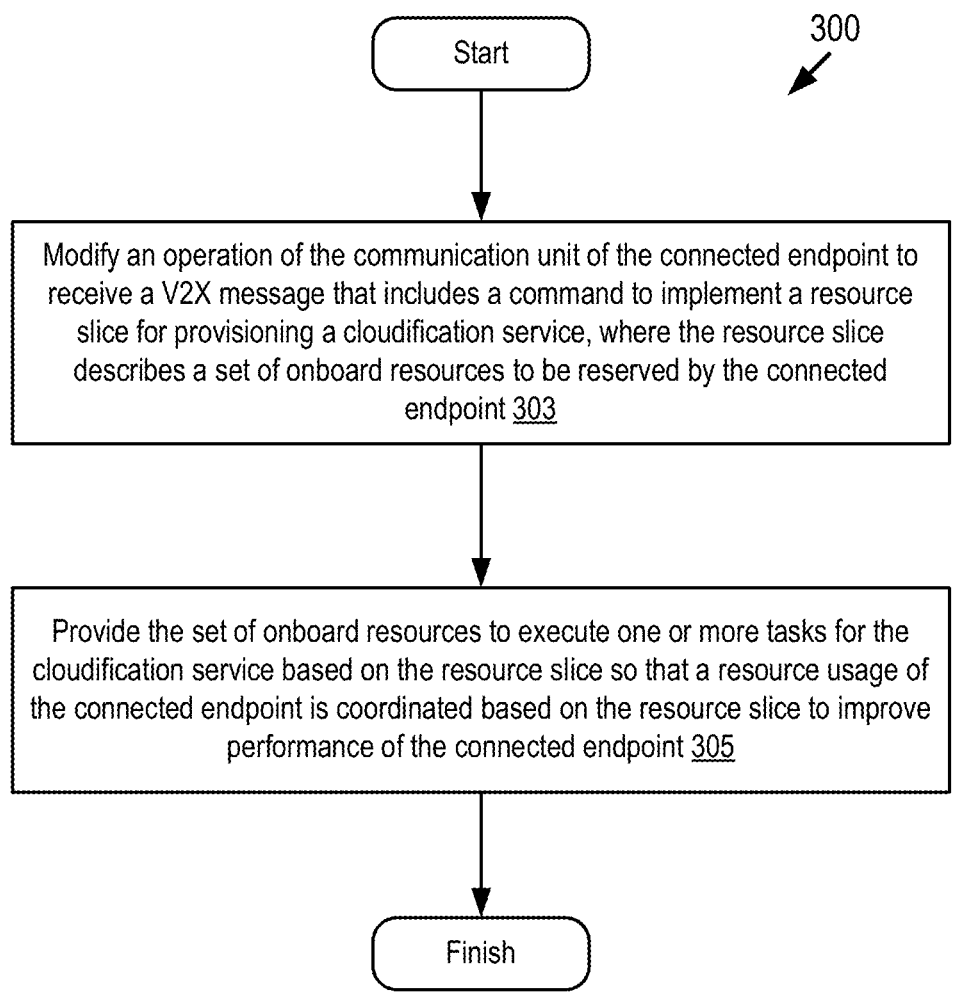
FIG. 3 depicts a method for coordinating a resource usage of a connected endpoint based on a resource slice according to some embodiments.

Referring now to FIG. 3, depicted is a flowchart of an example method 300 for coordinating a resource usage of a connected endpoint based on a resource slice according to some embodiments. The steps of the method 300 are executable in any order, and not necessarily the order depicted in FIG. 3.

At step 303, the operation module 210 modifies an operation of the communication unit 145 of the connected endpoint to receive a V2X message that includes a command to implement a resource slice for provisioning a cloudification service, where the resource slice describes a set of onboard resources to be reserved by the connected endpoint.

At step 305, the implementation module 206 provides the set of onboard resources to execute one or more tasks for the cloudification service based on the resource slice so that a resource usage of the connected endpoint is coordinated based on the resource slice to improve performance of the connected endpoint.

Figure 4A:
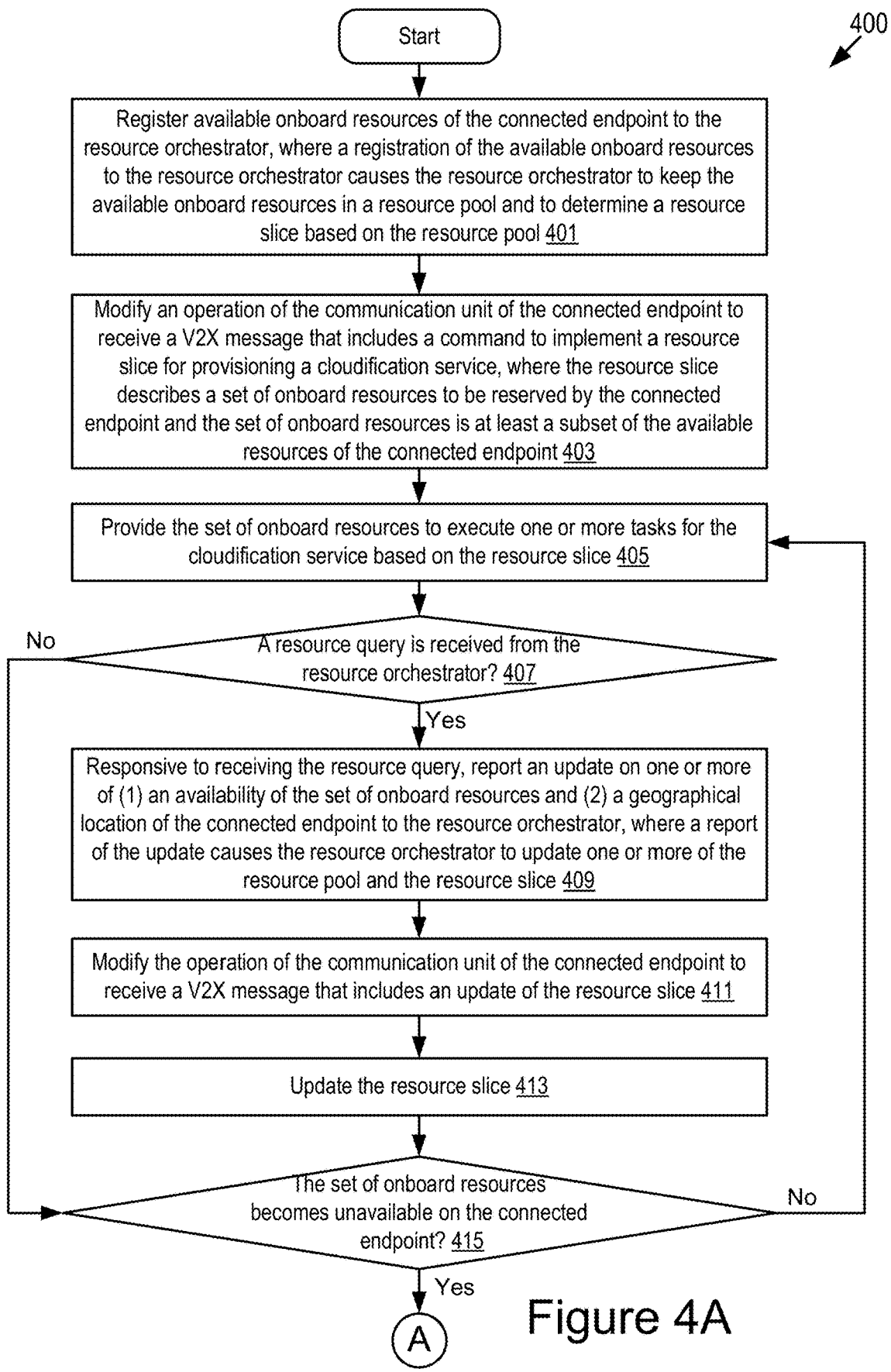
FIGS. 4A-4B depict another method for coordinating a resource usage of a connected endpoint based on a resource slice according to some embodiments.
Figure 4B:
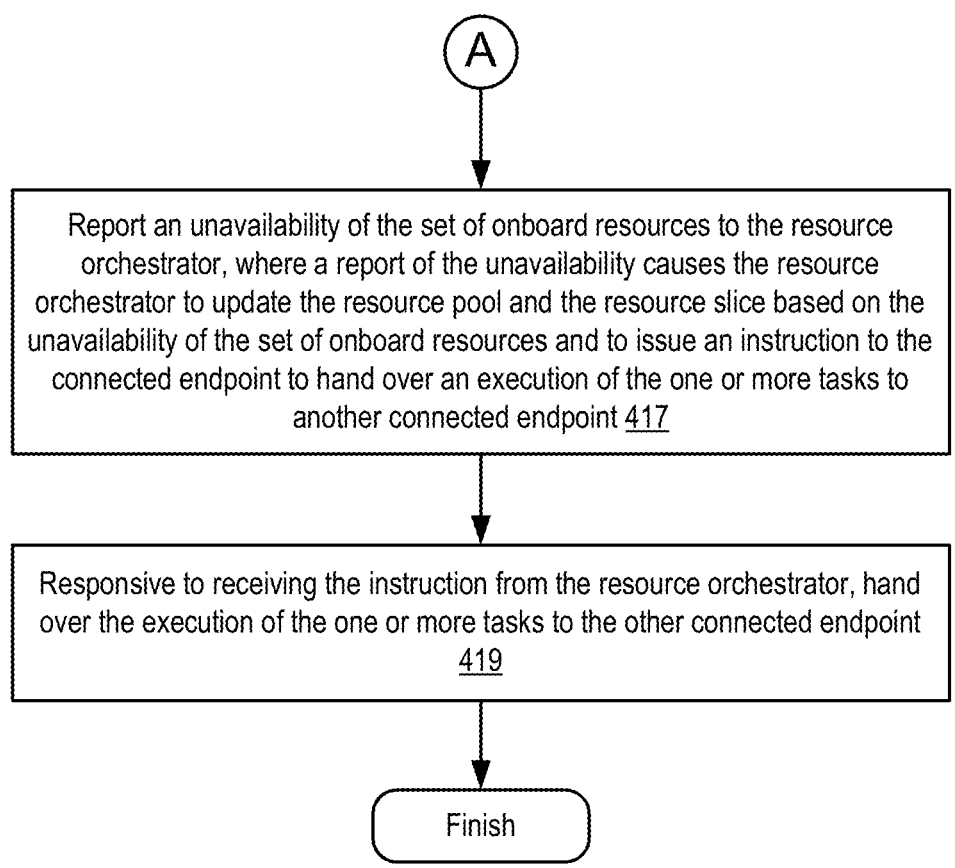

FIGS. 4A-4B depict another method 400 for coordinating a resource usage of a connected endpoint based on a resource slice according to some embodiments. The steps of the method 400 are executable in any order, and not necessarily the order depicted in FIGS. 4A-4B.

Referring to FIG. 4A, at step 401, the registration module 204 registers available onboard resources of the connected endpoint to the resource orchestrator 109, where a registration of the available onboard resources to the resource orchestrator 109 causes the resource orchestrator 109 to keep the available onboard resources in a resource pool and to determine a resource slice based on the resource pool.

At step 403, the operation module 210 modifies an operation of the communication unit 145 of the connected endpoint to receive a V2X message that includes a command to implement a resource slice for provisioning a cloudification service, where the resource slice describes a set of onboard resources to be reserved by the connected endpoint and the set of onboard resources is at least a subset of the available resources of the connected endpoint.

At step 405, the implementation module 206 provides the set of onboard resources to execute one or more tasks for the cloudification service based on the resource slice.

At step 407, the report module 208 determines whether a resource query is received from the resource orchestrator 109. Responsive to receiving the resource query, the method 400 moves to step 409. Otherwise, the method 400 moves to step 415.

At step 409, responsive to receiving the resource query, the report module 208 reports an update on one or more of (1) an availability of the set of onboard resources and (2) a geographical location of the connected endpoint to the resource orchestrator 109, where a report of the update causes the resource orchestrator 109 to update one or more of the resource pool and the resource slice.

At step 411, the operation module 210 modifies the operation of the communication unit 145 of the connected endpoint to receive a V2X message that includes an update of the resource slice.

At step 413, the report module 208 updates the resource slice accordingly.

At step 415, the report module 208 determines whether the set of onboard resources becomes unavailable on the connected endpoint. Responsive to the set of onboard resources becomes unavailable, the method 400 moves to step 417. Otherwise, the method 400 moves back to step 405 to provide the set of onboard resources to the execution of the one or more tasks based on the updated resource slice.

Referring to FIG. 4B, at step 417, the report module 208 reports an unavailability of the set of onboard resources to the resource orchestrator 109, where a report of the unavailability causes the resource orchestrator 109 to update the resource pool and the resource slice based on the unavailability of the set of onboard resources and to issue an instruction to the connected endpoint to hand over an execution of the one or more tasks to another connected endpoint.

At step 419, responsive to receiving the instruction from the resource orchestrator 109, the report module 208 hands over the execution of the one or more tasks to the other connected endpoint.

Figure 5:
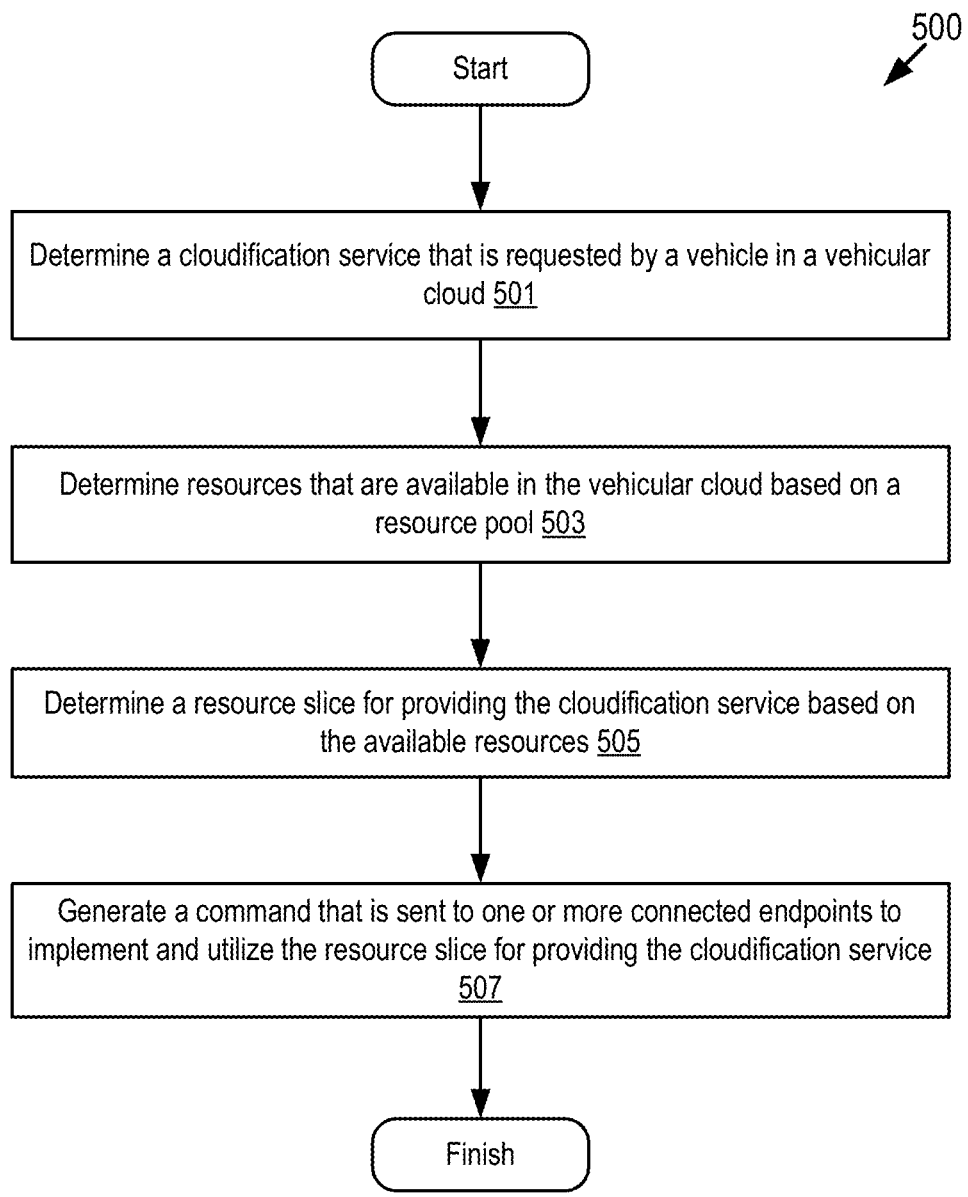
FIG. 5 depicts a method for managing available resources based on a resource slice to provide a cloudification service according to some embodiments.

FIG. 5 depicts a method 500 for managing available resources based on a resource slice to provide a cloudification service according to some embodiments. The steps of the method 500 are executable in any order, and not necessarily the order depicted in FIG. 5.

At step 501, the resource orchestrator 109 determines a cloudification service that is requested by a vehicle in a vehicular cloud.

At step 503, the resource orchestrator 109 determines resources that are available in the vehicular cloud based on a resource pool.

At step 505, the resource orchestrator 109 determines a resource slice for providing the cloudification service based on the available resources.

At step 507, the resource orchestrator 109 generates a command that is sent to one or more connected endpoints to implement and utilize the resource slice for providing the cloudification service.

Figure 6A:
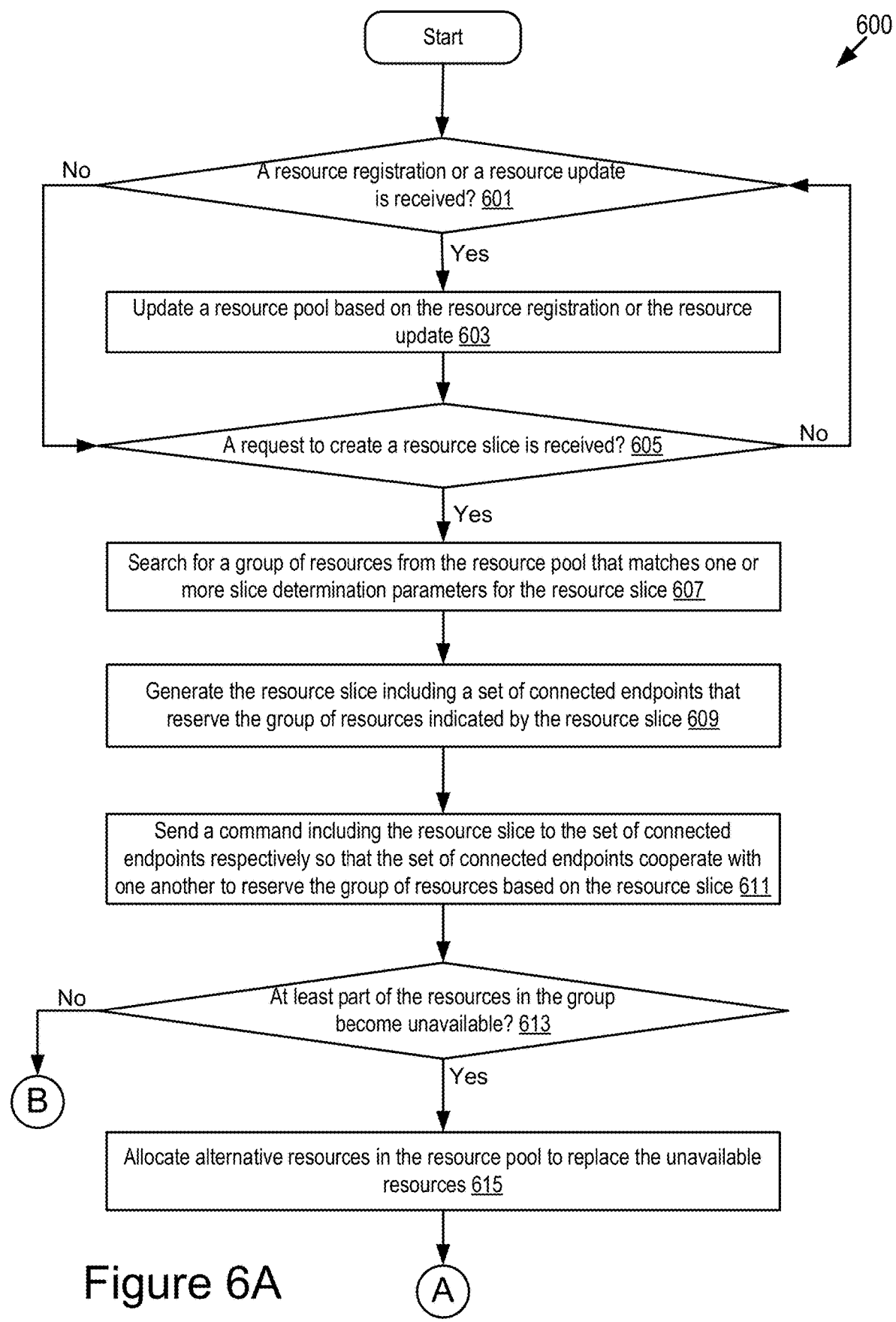
FIGS. 6A-6B depict another method for managing available resources based on resource slices according to some embodiments.
Figure 6B:
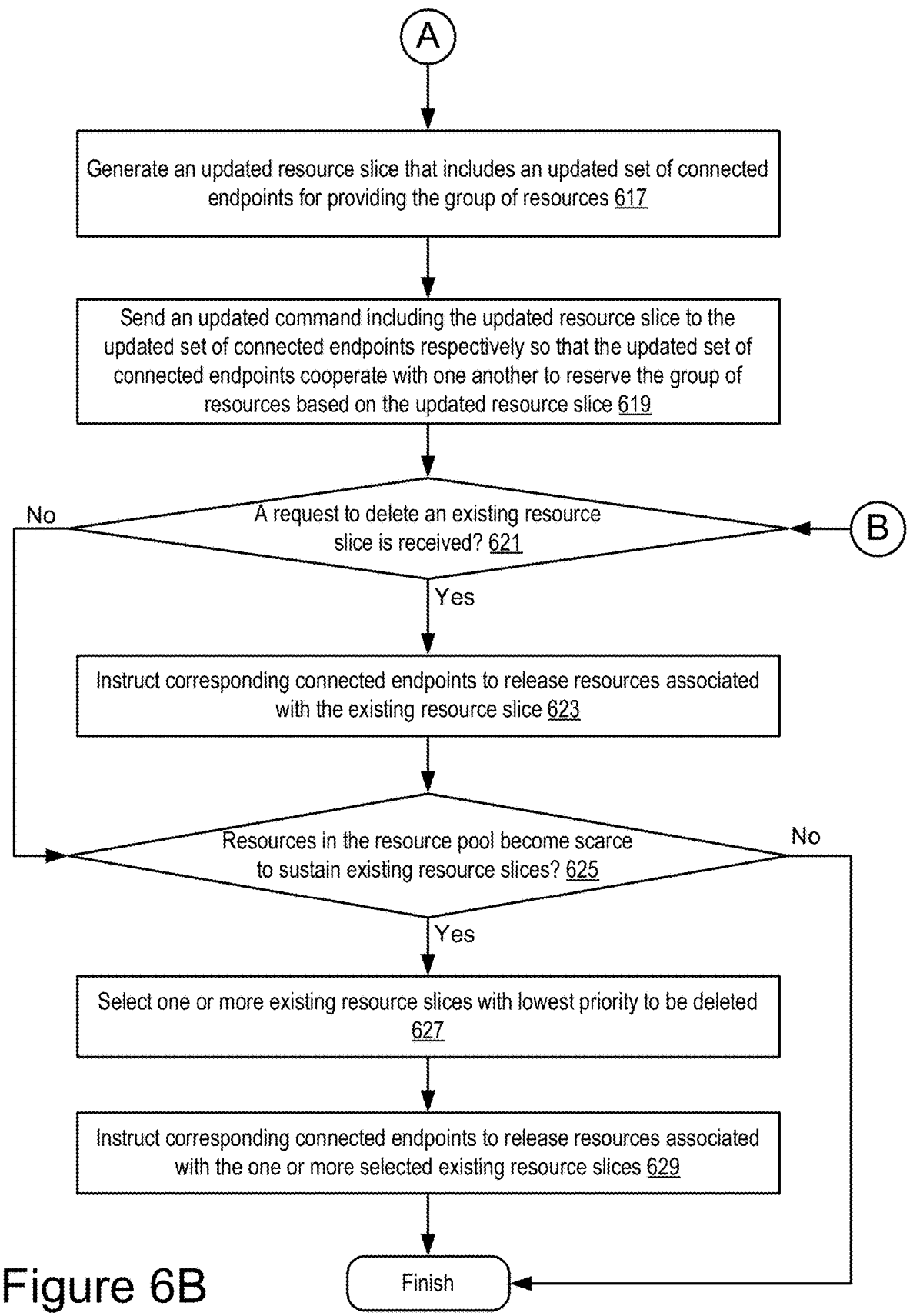

FIGS. 6A-6B depict another method 600 for managing available resources based on resource slices according to some embodiments. The steps of the method 600 are executable in any order, and not necessarily the order depicted in FIGS. 6A-6B.

Referring to FIG. 6A, at step 601, the resource orchestrator 109 determines whether a resource registration or a resource update is received from a connected endpoint. Responsive to receiving the resource registration or the resource update, the method 600 moves to step 603. Otherwise, the method 600 moves to step 605.

At step 603, the resource orchestrator 109 updates a resource pool based on the resource registration or the resource update.

At step 605, the resource orchestrator 109 determines whether a request to create a resource slice is received. For example, the resource orchestrator 109 may receive a request to create a resource slice from a vehicle that requests for a cloudification service. Responsive to receiving the request to create a resource slice, the method 600 moves to step 607. Otherwise, the method 600 moves back to step 601.

At step 607, the resource orchestrator 109 searches for a group of resources from the resource pool that match one or more slice determination parameters for the resource slice. For example, the resource orchestrator 109 searches for a group of resources in the resource pool that best match one or more resource requirements and a geographical constraint.

At step 609, the resource orchestrator 109 generates the resource slice including a set of connected endpoints that may reserve the group of resources indicated by the resource slice.

At step 611, the resource orchestrator 109 sends a command including the resource slice to the set of connected endpoints respectively so that the set of connected endpoints cooperate with one another to reserve the group of resources based on the resource slice.

At step 613, the resource orchestrator 109 determines whether at least part of the resources in the group become unavailable. Responsive to determining that at least part of the resources in the group becoming unavailable (e.g., some resources in the resource slice becoming unavailable due to degraded performance or a mobility of the connected endpoint such that the connected endpoint is about to move away from a designated geographical region), the method 600 moves to step 615. Otherwise, the method 600 moves to step 621.

At step 615, the resource orchestrator 109 allocates alternative resources in the resource pool to replace the unavailable resources.

Referring to FIG. 6B, at step 619, the resource orchestrator 109 generates an updated resource slice that includes an updated set of connected endpoints for providing the group of resources.

At step 619, the resource orchestrator 109 sends an updated command including the updated resource slice to the updated set of connected endpoints respectively so that the updated set of connected endpoints cooperate with one another to reserve the group of resources based on the updated resource slice.

At step 621, the resource orchestrator 109 determines whether a request to delete an existing resource slice is received. Responsive to receiving the request to delete an existing resource slice, the method 600 moves to step 623. Otherwise, the method 600 moves to step 625.

At step 623, the resource orchestrator 109 instructs corresponding connected endpoints to release resources associated with the existing resource slice.

At step 625, the resource orchestrator 109 determines whether resources in the resource pool become scarce to sustain existing resource slices. Responsive to determining that the resources in the resource pool become scarce, the method 600 moves to step 627. Otherwise, the method 600 ends.

At step 627, the resource orchestrator 109 selects one or more existing resource slices with lowest priority to be deleted.

At step 629, the resource orchestrator 109 instructs corresponding connected endpoints to release resources associated with the one or more selected existing resource slices.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for a connected endpoint that contributes to a provisioning of a cloudification service in a vehicular micro cloud, the method comprising:

modifying an operation of a communication unit of the connected endpoint to receive a Vehicle-to-Everything (V2X) message that includes a command to implement a resource slice for provisioning the cloudification service, wherein the resource slice describes a set of onboard resources to be reserved by the connected endpoint;

registering the set of onboard resources to a resource orchestrator, wherein a registration of the set of onboard resources to the resource orchestrator causes the resource orchestrator to keep the set of onboard resources in a resource pool and to determine the resource slice based on the resource pool; and providing the set of onboard resources to execute one or more tasks for the cloudification service based on the resource slice so that a resource usage of the connected endpoint is coordinated based on the resource slice to improve performance of the connected endpoint.

2. The method of claim 1, wherein the resource slice describes a resource type and a reservation amount of each onboard resource to be reserved by the connected endpoint.

3. The method of claim 2, wherein an amount of each onboard resource consumed by an execution of the one or more tasks is not greater than the reservation amount of a corresponding onboard resource indicated by the resource slice.

4. The method of claim 1, wherein the resource slice describes multiple sets of onboard resources to be reserved by multiple connected endpoints so that resource usages across the multiple connected endpoints are coordinated based on the resource slice to improve performance of the multiple connected endpoints.

5. The method of claim 4, wherein the resource slice is configured to host a group of cloudification services simultaneously in the vehicular micro cloud so that the resource usages across the multiple connected endpoints are coordinated based on the resource slice to provision the group of cloudification services simultaneously.

6. The method of claim 1, wherein the resource slice satisfies one or more slice determination parameters that include one or more of the following: a constraint of a geographical region where the provisioning of the cloudification service is located; one or more resource requirements related to the provisioning of the cloudification service; one or more resource attributes defined in a standard; and a slice priority attribute.

7. The method of claim 1, wherein a geographical location of the set of onboard resources changes over time due to a mobility of the connected endpoint.

8. The method of claim 1, wherein registering the set of onboard resources includes reporting a geographical location of the connected endpoint and an amount of each available onboard resource to the resource orchestrator.

9. The method of claim 1, further comprising:
determining that the set of onboard resources becomes unavailable on the connected endpoint;
reporting an unavailability of the set of onboard resources to the resource orchestrator, wherein a report of the unavailability causes the resource orchestrator to update the resource pool and the resource slice based on the unavailability of the set of onboard resources and to issue an instruction to the connected endpoint to hand over an execution of the one or more tasks to an other connected endpoint; and
responsive to receiving the instruction from the resource orchestrator, handing over the execution of the one or more tasks to the other connected endpoint.

10. The method of claim 1, further comprising:
receiving a resource query from the resource orchestrator; and
responsive to receiving the resource query, reporting an update on one or more of an availability of the set of onboard resources and a geographical location of the connected endpoint to the resource orchestrator, wherein a report of the update causes the resource orchestrator to update one or more of the resource pool and the resource slice.

11. The method of claim 1, wherein the connected endpoint acts as a lower-tier resource orchestrator and the method further comprises:
managing, by the connected endpoint, positions and resource availability of members in the vehicular micro cloud; and
reporting, by the connected endpoint, the positions and the resource availability of the members in the vehicular micro cloud to an upper-tier resource orchestrator.

12. The method of claim 11, further comprising:
receiving, by the connected endpoint, a request from the upper-tier resource orchestrator to reserve one or more resources in the vehicular micro cloud; and
identifying a set of members in the vehicular micro cloud for providing the one or more resources requested by the upper-tier resource orchestrator based on a local resource pool managed by the connected endpoint so that a provisioning of the one or more resources requested by the upper-tier resource orchestrator is guaranteed in the vehicular micro cloud.

13. A system for a connected endpoint that contributes to a provisioning of a cloudification service in a vehicular micro cloud, the system comprising:
a processor; and
a non-transitory memory storing computer code which, when executed by the processor, causes the processor to:
modify an operation of a communication unit of the connected endpoint to receive a Vehicle-to-Everything (V2X) message that includes a command to implement a resource slice for provisioning the cloudification service, wherein the resource slice describes a set of onboard resources to be reserved by the connected endpoint;
register the set of onboard resources to a resource orchestrator, wherein a registration of the set of onboard resources to the resource orchestrator causes the resource orchestrator to keep the set of onboard resources in a resource pool and to determine the resource slice based on the resource pool; and
provide the set of onboard resources to execute one or more tasks for the cloudification service based on the resource slice so that a resource usage of the connected endpoint is coordinated based on the resource slice to improve performance of the connected endpoint.

14. The system of claim 13, wherein the resource slice describes a resource type and a reservation amount of each onboard resource to be reserved by the connected endpoint.

15. The system of claim 14, wherein an amount of each onboard resource consumed by an execution of the one or more tasks is not greater than the reservation amount of a corresponding onboard resource indicated by the resource slice.

16. The system of claim 13, wherein the resource slice describes multiple sets of onboard resources to be reserved by multiple connected endpoints so that resource usages across the multiple connected endpoints are coordinated based on the resource slice to improve performance of the multiple connected endpoints.

17. The system of claim 16, wherein the resource slice is configured to host a group of cloudification services simultaneously in the vehicular micro cloud so that the resource usages across the multiple connected endpoints are coordinated based on the resource slice to provision the group of cloudification services simultaneously.

18. A computer program product comprising a non-transitory memory storing computer-executable code that, when executed by a processor, causes the processor to:
modify an operation of a communication unit of a connected endpoint to receive a Vehicle-to-Everything (V2X) message that includes a command to implement a resource slice for provisioning a cloudification service, wherein the resource slice describes a set of onboard resources to be reserved by the connected endpoint;
register the set of onboard resources to a resource orchestrator, wherein a registration of the set of onboard resources to the resource orchestrator causes the resource orchestrator to keep the set of onboard resources in a resource pool and to determine the resource slice based on the resource pool; and
provide the set of onboard resources to execute one or more tasks for the cloudification service based on the resource slice so that a resource usage of the connected endpoint is coordinated based on the resource slice to improve performance of the connected endpoint.

19. The computer program product of claim 18, wherein the resource slice describes a resource type and a reservation amount of each onboard resource to be reserved by the connected endpoint.

20. The computer program product of claim 19, wherein an amount of each onboard resource consumed by an execution of the one or more tasks is not greater than the reservation amount of a corresponding onboard resource indicated by the resource slice.

* * * * *